(12) United States Patent
Chu et al.

(10) Patent No.: US 8,222,166 B2
(45) Date of Patent: Jul. 17, 2012

(54) HIGH FLUX AND LOW FOULING FILTRATION MEDIA

(75) Inventors: Benjamin Chu, Setauket, NY (US);
Benjamin S. Hsiao, Setauket, NY (US);
Dufei Fang, East Setauket, NY (US);
Kwang-Sok Kim, Seoul (KR)

(73) Assignee: The Research Foundation of State University of New York, Albany, NY (US)

( * ) Notice: Subject to any disclaimer, the term of this patent is extended or adjusted under 35 U.S.C. 154(b) by 863 days.

(21) Appl. No.: 11/664,650

(22) PCT Filed: Oct. 5, 2005

(86) PCT No.: PCT/US2005/035738
§ 371 (c)(1),
(2), (4) Date: Jan. 7, 2009

(87) PCT Pub. No.: WO2007/001405
PCT Pub. Date: Jan. 4, 2007

(65) Prior Publication Data
US 2010/0323573 A1    Dec. 23, 2010

Related U.S. Application Data

(60) Provisional application No. 60/616,592, filed on Oct. 6, 2004, provisional application No. 60/633,987, filed on Dec. 7, 2004.

(51) Int. Cl.
*B32B 9/04* (2006.01)
*B32B 19/00* (2006.01)
*B32B 5/02* (2006.01)
*B32B 5/16* (2006.01)
*B32B 5/26* (2006.01)

(52) U.S. Cl. ........ 442/153; 428/221; 428/323; 428/328; 428/331; 428/357; 428/364; 428/365; 428/381; 428/401; 442/59; 442/63; 442/164; 442/167; 442/168; 442/170; 442/171

(58) Field of Classification Search .................. 428/357, 428/364, 365, 401, 323, 328, 331, 221, 381; 442/59, 63, 153, 170, 171, 164, 168, 167
See application file for complete search history.

(56) References Cited

U.S. PATENT DOCUMENTS 5,049,167 A    9/1991  Castro et al.
(Continued)

FOREIGN PATENT DOCUMENTS

WO    WO 2004/044281 A1    5/2004

OTHER PUBLICATIONS

Paiva et al., "Effect of Functionalized Single-wall Carbon Nanotubes on PVA Morphology and Tensile Properties", Clemson University: Center for Advanced Engineering Fibers and Films (2003), Experimental.

(Continued)

*Primary Examiner* — Norca L Torres Velazquez
(74) *Attorney, Agent, or Firm* — Carter, DeLuca, Farrell & Schmidt, LLP

(57) ABSTRACT

Membranes suitable for microfiltration, ultrafiltration (UF) and nanofiltration (NF) filters are provided. Such membranes may include a nanofibrous scaffold, optionally in combination with a non-woven substrate and/or a coating of a polymer and a functionalized nanofiller. Suitable membranes may also include a coating of a polymer and a functionalized nanofiller on a substrate, which can include a non-woven membrane, a nanofibrous scaffold, or both.

38 Claims, 23 Drawing Sheets

U.S. PATENT DOCUMENTS

| | | | |
|---|---|---|---|
| 6,162,358 | A | 12/2000 | Li et al. |
| 6,536,605 | B2 | 3/2003 | Rice et al. |
| 6,680,016 | B2 | 1/2004 | Wang et al. |
| 7,090,712 | B2 | 8/2006 | Gillingham et al. |
| 7,141,518 | B2 * | 11/2006 | MacDonald et al. ............ 442/59 |
| 2002/0014182 | A1 | 2/2002 | Yadav et al. |
| 2002/0173213 | A1 | 11/2002 | Chu et al. |
| 2003/0232187 | A1 | 12/2003 | Kauffman et al. |
| 2006/0159916 | A1 * | 7/2006 | Dubrow et al. ............... 428/357 |
| 2008/0110342 | A1 * | 5/2008 | Ensor et al. ....................... 96/54 |
| 2008/0145934 | A1 * | 6/2008 | Harris et al. .................. 435/404 |

OTHER PUBLICATIONS

Paiva et al., "Mechanical and Morphological Characterization of Polymer-Carbon Nanocomposites from Functionalized Carbon Nanotubes", Carbon 42, 2824-2854 (2004).

International Search Report and Written Opinion of the International Searching Authority from Int'l Publication No. WO/2007/001405.

Young, "International Search Report," 2 pages, from International Patent Application No. PCT/US07/86549 (mailed Sep. 17, 2008).

* cited by examiner

HIGH FLUX AND LOW FOULING FILTRATION MEDIA

CROSS-REFERENCE TO RELATED APPLICATIONS

This application claims the benefit of and priority to PCT Application No. PCT/US2005/035738 filed on Oct. 5, 2005 which, in turn, claims the benefit of and priority to U.S. Provisional Patent Application Ser. No. 60/616,592 filed Oct. 6, 2004, and U.S. Provisional Patent Application No. 60/633,987 filed Dec. 7, 2004, the entire disclosures of each of which are hereby incorporated by reference herein.

GOVERNMENT RIGHTS

This invention was made with Government support under U.S. Office of Naval Research Grant N000140310932. The Government has certain rights in the invention.

BACKGROUND

Ultrafiltration (UF) is a technology utilized for water purification which separates dissolved molecules on the basis of size by passing a solution through a fine filter. The ultrafilter is generally a tough, thin, selectively permeable membrane that retains most macromolecules and/or particles above a certain size including colloids, microorganisms and pyrogens. Thus, UF provides a retained fraction (retentate) that is rich in large molecules and/or particles and a filtrate that contains few, if any, of these molecules and/or particles.

Current state-of-the-art ultrafiltration technology utilizes ceramic micro-filters or perforated hollow fibers. Problems with these filtering systems include membrane fouling and membrane cost, which are responsible for the high cost and low efficiency treatment of fluids such as water, including bilge water (water that collects and stagnates in the bilge of a ship) and produced water (water produced during the production of hydrocarbons, which is considered a contaminant of oil and gas). The symptom of fouling is an unavoidable consequence of gradual blockage of the permeability of the membrane during filtration. The fouling rate is a function of many variables, such as the surface characteristics of the membrane, the surface-to-volume ratio of the membrane, the flow rate, the permeant concentration, filtration temperature, and the character of the feed and retentate streams.

Today, commercially available polymeric membrane systems can be categorized mainly into three different types: (1) hollow fiber filters, (2) tubular filters, and (3) spiral wound filters. The hollow fiber filter consists of bundled hollow fibers with an internal diameter of about 1 mm. The advantage of this filter system is its low cost, physical strength and light weight. The disadvantages of this system are its tendency to clog, fiber breakage, and it is more accessible to chemical and biological attack. The tubular filter consists of individual tubes with internal diameters of about 1 cm. It is not subject to clogging but is subject to chemical and biological attack. The low packing density of tubular filters also leads to low filtration efficiency. The spiral wound filter consists of rolled up sheet membranes with a supporting spacer. It has the advantage of lower cost and is light weight, but it is also subject to chemical and biological attack.

Research is ongoing for suitable polymers for membrane applications. Many polymer systems, such as cellulose acetate, polyacrylonitrile (PAN), polyethersulfone (PES), polyamides, and polyvinylidenefluoride (PVDF) have been used in conventional ultra-filtration and nano-filtration membranes. Very often, homopolymer systems alone are not sufficient to achieve good filtration properties. Chemical modifications, such as copolymerization, polymer grafting and crosslinking, as well as physical modifications such as polymer blending, have been used to improve the hydrophilicity and biological functions for the filtration of water such as bilge water. Currently; several research groups have been exploring new material systems for membrane applications. These systems include amphiphilic graft copolymers based on PVDF, poly[1-(trimethylsilyl)-1-propyne] (poly(TMSP)), crosslinked lyotropic liquid crystal assembly, ion selected nanostructured supramolecular membranes, hollow helical molecules, and block copolymers containing hydrophilic poly(2-dimethylaminoethyl methacrylate) (PDMAEMA) and hydrophobic poly(1,1'-dihydroperfluorooctyl methacrylate) (PFOMA) or poly(1,1,2,2-tetrahydroperfluorooctyl acrylate) (PTAH) block.

The high fouling rate of low-cost filters (e.g., polymeric hollow fibers and spiral wound membranes) requires the frequent replacement of these filters, resulting in a correspondingly high operational cost. High-cost ceramic filters, although capable of overcoming some of the disadvantages of low-cost polymeric filters, do not fully address these challenges.

Improved filters for use in ultrafiltration systems, which are lower in cost and have lower fouling at higher rates of flux, are thus desirable.

SUMMARY

The present disclosure provides articles including a substrate having a coating. The coating includes a polymer in combination with at least one nanofiller having a diameter from about 0.3 nm to about 300 nm. In some embodiments, the substrate may include a nanofibrous scaffold made of fibers having a diameter from about 1 nm to about 20,000 nm.

The present disclosure also provides articles including nanofibrous scaffolds made of fibers having a diameter of from about 1 nm to about 20,000 nm. The scaffolds have voids with an effective diameter of from about 2 nm to about 200 µm and a thickness of froth about 1 µm to about 500 µm.

Articles are also provided that include a substrate, a nanofibrous scaffold made of fibers having a diameter of from about 1 nm to about 20,000 nm applied to a surface of the substrate, and a coating on the nanofibrous scaffold on a surface opposite the surface applied to the substrate which includes a polymer in combination with at least one functionalized nanofiller having a diameter ranging from about 1 nm to about 100 nm:

Finally, the present disclosure provides articles including an asymmetric nanofibrous scaffold layer having a bottom surface and a top surface; the fibers making up the bottom surface of the nanofibrous scaffold having a diameter from about 300 nm to about 10,000 nm and the fibers making up the top surface of the nanofibrous scaffold having a diameter from about 10 nm to about 500 nm, wherein the diameter of the fibers making up the bottom surface of the nanofibrous scaffold is greater than the diameter of the fibers making up the top surface of the nanofibrous scaffold.

BRIEF DESCRIPTION OF THE FIGURES

Various embodiments of the present disclosure will be described herein below with reference to the figures wherein:

FIG. 12A is an electrospun PVA coated with pure, PEBAX; FIG. 12B is an electrospun PVA coated with 10 wt % MWNT/PVA hydrogel nanocomposite; FIG. 12C is an enlarged image of the coating layer in FIG. 12B (circled area);

FIG. 15A is 98% hydrolyzed, $M_w$ 13,000-23,000 g/mol (electrospun from 24 wt % solution); FIG. 15B is 98% hydrolyzed, $M_w$ 78,000 g/mol (from 11 wt % solution); FIG. 15C is 98-99% hydrolyzed, $M_w$ 85,000-124,000 g/mol (from 9 wt % solution);

FIG. 16A is 98% hydrolyzed, LMw; FIG. 16B is 98% hydrolyzed, MMw; FIG. 16C is 98-99% hydrolyzed, HMw;

FIG. 17A is 88-89%; FIG. 17B is 96%; FIG. 17C is 98-99%;

FIG. 18A is 88-89%; FIG. 18B is 96%; FIG. 18C is 98-99%;

FIG. 19A is 96% hydrolyzed, HMw; FIG. 19B is 98-99% hydrolyzed, HMw;

FIG. 20A is 96% hydrolyzed HMw; FIG. 20B is 98-99% hydrolyzed HMw;

DETAILED DESCRIPTION OF PREFERRED EMBODIMENTS

Figure 1B:
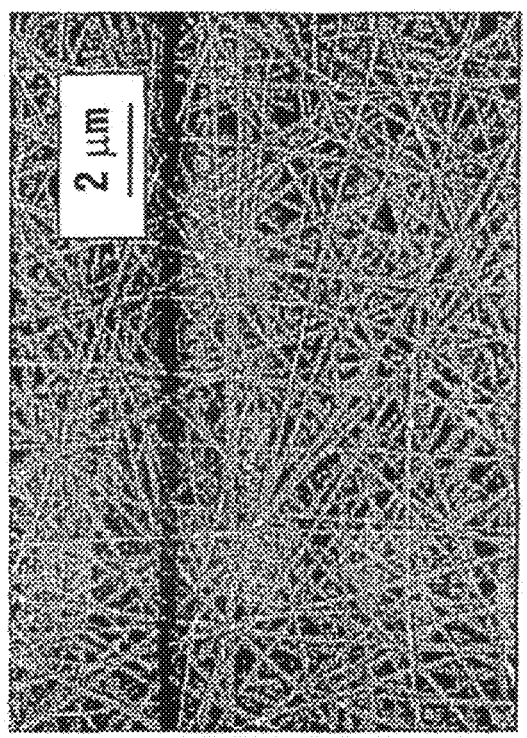
FIG. 1 is a schematic diagram of a three-fief composite ultra-filtration (UF) filter membrane of the present disclosure (FIG. 1A) and representative SEM image of an electrospun PVA substrate (FIG. 1B)

The present disclosure provides high-flux, low-fouling filtration media for liquid and particle separations, which may be utilized to produce low cost micro-filtration, ultra-filtration (UF) or nano-filtration (NF) filters. As used herein, a micro-filtration filter includes a filter having pore sizes comparable or smaller than the particles the filter wants to exclude, with an average pore or channel size from about 0.5 microns to about 100 microns, typically from about 1 micron to about 30 microns. An ultra-filtration or UF filter includes a filter having an average pore or channel size from about 0.005 microns to about 0.5 microns, typically from about 0.05 microns to about 0.2 microns, while a nano-filtration or NF filter includes a filter having an average pore or channel size from about 0.0005 microns to about 0.05 microns, typically from about 0.001 microns to about 0.02 microns.

The present disclosure also provides a method for fabricating high-flux and low-fouling ultra-filtration and nano-filtration filters for fluid filtration, including bilge water filtration, produced water filtration, and ballast water filtration. In embodiments, the present disclosure utilizes electro-spun/electro-blown nano-fibrous scaffolds as the filter membrane. In other embodiments, the membranes of the present disclosure include a coating possessing a polymer and a functionalized nanofiller(s) on a substrate: the substrate can be the nano-fibrous scaffold noted above or some other substrate.

In other embodiments, the high-flux low-fouling membranes of the present disclosure may include at least a three-tier approach to fabricate composite membranes of multi-functional hybrid structures. Such membranes may include: (1) at least one layer of a non-woven substrate; (2) a middle layer applied to the substrate which can be a high-flux nanofibrous scaffold of the present disclosure with inter-connected void volume morphology and enhanced mechanical, chemical and thermal stability, or a non-fibrous scaffold with directed void-volume morphology; and (3) a coating of a very thin, smooth-surface layer of a polymer in combination with a functionalized nanofiller applied to the middle layer.

In some embodiments, the substrate may include a high-flux electro-spun nano-fibrous scaffold, and the coating may include functional hydrogels with nano-scale porosity or a polymer and a functionalized nanofiller(s) nanocomposite having nano-scale porosity. In some other embodiments, the substrate/scaffold may include a porous membrane fabricated by the phase inversion method, and the coating may include a polymer and a functionalized nanofiller(s) nanocomposite having nano-scale porosity.

As noted above, the membranes of the present disclosure may include any substrate currently in use with ultra-filtration or nano-filtration membranes including, but not limited to, hydrophilic polymers, hydrophobic polymers, and hydrophilic/hydrophobic copolymers. Specific examples of polymers which may be utilized include, but are not limited to, polyolefins including polyethylene and polypropylene, polyesters including polyethylene terephthalate, polytrimethylene terephthalate and polybutylene terephthalate, polyamides including nylon 6, nylon 66, and nylon 12, polyurethanes, fluorinated polymers, cellulose, polyetherketones, polystyrene, sulfonated polyetherketones, sulfonated polystyrene and derivatives thereof, and copolymers thereof. In some embodiments, commercially available substrates made of polyethylene terephthalate (PET), isotactic polypropylene (iPP), polyethylene (PE), cellulose acetates, and fluorinated polymers may be utilized. In one embodiment, a non-woven PET micro-filter, such as FO2413 (commercially available from Freudenburg Nonwovens (Hopkinsville, Ky.) and having fibers with diameters of about 10 µm), may be utilized as the substrate.

In some embodiments, suitable substrates may include hydrophobic/hydrophilic copolymers. Such copolymers include, but are not limited to, polyurethane copolymers, polyurea copolymers, polyether-b-polyamide, PEG-modified fluorinated copolymers, ethylene-propylene copolymers, ethylene based copolymers, propylene based copolymers. These copolymers, which possess excellent mechanical strength and durability, may be useful in embodiments where such characteristics are desired for the filter.

As noted above, other suitable substrates may include porous membranes, including those fabricated by a phase inversion method. Phase inversion methods are within the purview of those skilled in the art and generally include: (1) casting a solution or mixture possessing high molecular weight polymer(s), solvent(s), and nonsolvent(s) into thin films, tubes, or hollow fibers; and (2) precipitating the polymer. The polymer may be precipitated, in embodiments, by: evaporating the solvent and nonsolvent (dry process); exposing the material to a nonsolvent vapor (e.g. water vapor), which absorbs on the exposed surface (vapor phase-induced precipitation process); quenching in a nonsolvent liquid, generally water (wet process); or thermally quenching a hot film so that the solubility of the polymer is greatly reduced (thermal process).

Suitable porous substrates, including those prepared by a phase inversion process, are within the purview of those skilled in the art and include, for example, substrates produced from polymers such as polysulfones (e.g. polyethersulfone), cellulose acetates, fluoropolymers (e.g. polyvinylidene fluoride (PVDF) and polyoxyethylene methacrylate (POEM) grafted PVDF), polyamides (e,g, polyether-b-polyamide). Such substrates may have a porosity of from about 5 nm to about 250 nm, in embodiments from about 20 nm to about 100 nm.

Nanofibrous scaffold supports which may be utilized in forming the membranes of the present disclosure: (1) may be utilized by themselves to form membranes of the present disclosure; (2) may be applied to a substrate as described above to form a membrane of the present disclosure; (3) may be coated with a polymer/functionalized nanofiller of the present disclosure to form a membrane of the present disclosure; or (4) may be used in combination with both a substrate as described above and a polymer/functionalized nanofiller coating of the present disclosure to form a membrane of the present disclosure.

These nanofibrous membranes may be made of suitable polymers within the purview of those skilled in the art including, but not limited to, polyolefins including polyethylene and polypropylene, polysulfones such as polyethersulfone, fluoropolymers such as polyvinylidene fluoride, polyesters including polyethylene terephthalate, polytrimethylene terephthalate, and polybutylene terephthalate, polyamides including nylon 6, nylon 66, and nylon 12, polycarbonates, polystyrenes, polyacrylonitrile, polyacrylates such as polymethyl methacrylate, polyacetates such as polyvinyl acetate, polyalcohols such as polyvinyl alcohol, polysaccharides such as chitosan, cellulose, collagen, gelatin, polyalkylene oxides such as polyethylene oxide and polyethylene glycol, polyurethanes, polyureas, polyvinyl chloride, polyimines such as polyethylene imine, polyvinylpyrrolidone, polyacrylic acids, polysiloxanes such as polydimethylsiloxane, poly(ester-co-glycol) copolymers, poly(ether-co-amide) copolymers, crosslinked forms thereof, derivatives thereof and copolymers thereof. In some embodiments, poly(acrylonitrile) (PAN), polyethersulfone (PES), polyvinylidenefluoride (PVDF), crosslinked water soluble polymers, e.g., polyvinylalcohol (PVA), modified cellulose and modified chitosan, their chemical derivatives and copolymers may be utilized.

In some embodiments, it may be desirable to crosslink fluid-soluble polymers. For example, water-soluble polymers, such as polyvinyl alcohol, polysaccharides (including chitosan and hyaluronan), polyalkylene oxides (including polyethylene oxide), gelatin and their derivatives to render these polymers suitable for use as a hydrophilic nanofibrous scaffold. Crosslinking may be conducted using methods within the purview of those skilled in the art, including the use of crosslinking agents. Suitable crosslinking agents include, but are not limited to, $C_2$-$C_8$ dialdehyde, $C_2$-$C_8$ monoaldehydes having an acid functionality, and $C_2$-$C_9$ polycarboxylic acids. These compounds are capable of reacting with at least two hydroxyl groups of a water-soluble polymer. Other suitable crosslinking methods include conventional thermal-, radiation- and photo-crosslinking reactions within the purview of those skilled in the art. Two important criteria for the selection of a crosslinking agent or method are as follows: (1) the crosslinking agent or method should not dissolve the nanofibrous scaffold layer, and (2) the crosslinking agent or method should not induce large dimensional change, e.g., hydrophilic electrospun nanofibrous scaffold layers may display very large shrinkage in hydrophobic solvents such as hydrocarbons because of their hydrophilic nature.

Specific examples of crosslinking agents which may be utilized include, but are not limited to, glutaraldehyde, glyoxal, formaldehyde, glyoxylic acid, oxydisuccinic acid and citric acid. In some embodiments, it may be useful to treat polyvinyl alcohol with a crosslinking agent such as glutaraldehyde.

The amount of crosslinking agent added to the water-soluble polymer such as polyvinyl alcohol may vary, from about 0.1 to about 10 percent by weight of the combined crosslinking agent and polymer, in some embodiments from about 0.5 to about 5 percent by weight of the combined crosslinking agent and polymer.

In forming the nanofibrous scaffold of the present disclosure, the polymer is typically first placed in a solvent, such as N,N-dimethyl formamide (DMF), tetrahydrofuran (Tiff), methylene chloride, dioxane, ethanol, propanol, butanol, chloroform, water, or mixtures of these solvents, so that the polymer is present at an amount ranging from about 1 to about 40 wt %, typically from about 3 to about 25 wt %; more typically from about 5 to about 15 wt % of polymer solution.

In some useful embodiments, PAN may be utilized as the nanofibrous scaffold; in/other embodiments, PVA which is crosslinked with glutaraldehyde may be used as the nanofibrous scaffold.

In some embodiments, it may be desirable to add a surfactant or another solvent-miscible liquid to the polymer solution utilized to form the nanofibrous scaffold to lower the surface tension of the solution, which may help stabilize the polymer solution during electro-spinning, electro-blowing, and the like. Suitable surfactants include, for example, octylphenoxypolyethoxy ethanol (commercially available as Triton X-100), sorbitan monolaurate, sorbitan sesquioleate, glycerol monostearate, polyoxyethylene, polyoxyethylene cetyl ether, dimethyl alkyl amines and methyl dialkyl amines, and the like. Where utilized, the surfactant may be present in an amount from about 0.001 to about 10 percent by weight of the polymer solution, typically from about 0.05 to about 5 percent by weight of the polymer solution, in embodiments from about 0.1 to about 2 percent by weight of the polymer solution. The solvent miscible fluid forms a solvent mixture with the solvent that can dissolve the polymer but changes the surface tension of the polymer solution and the evaporation rate of the solvent mixture.

As noted above, the nanofibrous scaffold may be utilized by itself, with a substrate as described above, with a polymer/functionalized nanofiller coating described below, or in combination with both a substrate and a polymer/functionalized nanofiller coating to form a three-tier membrane. An ultrafiltration membrane of the present disclosure containing three tiers may be as shown schematically in FIGS. 1A and 2.

In embodiments, the nanofibrous scaffold may be fabricated using electro-spinning, electro-blowing, blowing-assisted electro-spinning, and/or solution blowing technologies. Blowing-assisted electro-spinning and electro-blowing both use electric force and gas-blowing shear forces. In blowing-assisted electro-spinning processes, the electric force is the dominating factor, while the gas-blowing feature can assist in shearing the fluid jet stream and in controlled evaporation of the solvent (lower throughput, smaller diameter). In contrast, in electro-blowing processes the gas-blowing force is the dominating factor to achieve the desired spin-draw ratio, while the electric force may enable further elongation of fiber (higher throughput, larger diameter). Electro-spinning processes use only electric force, but without the assistance of gas flow. To the contrary, solution blowing processes use only gas flow, without the use of electric force.

In one particularly useful embodiment, the middle layer, such as PAN or PVA, may be electrospun on a substrate, such as a non-woven PET micro-filter (FO2413 from Freudenburg Nonwovens) utilizing methods known to those skilled in the art.

The applied electric field potentials utilized in electrospinning can vary from about 10 to about 40 kV, typically from about 15 to about 30 kV, with a distance between the spinneret and the collector of from about 5 to about 20 cm, typically from about 8 to about 12 cm, and a solution flow rate of from about 10 to about 40 μl/min, typically from about 20 to about 30 μl/min. In one embodiment the electrospinning process can use an applied electric field strength of about 2 kV/cm and a solution flow rate of about 25 μl/min.

Methods for forming fibers by electro-blowing are within the purview of those skilled in the art and include, for example, the methods disclosed in U.S. Patent Publication No. 2005/0073075, the entire disclosure of which is incorporated by reference herein. Briefly, in an electro-blowing process, an electrostatic field is combined with a gaseous flow field. Like melt blowing (no charge required), where the liquid droplet is pulled out by the gaseous flow, with electro-blowing the combined forces are strong enough to overcome the surface tension of the charged liquid droplet. This permits the use of electrostatic fields and gas flow rates that are significantly reduced compared to either method alone.

Both the gaseous flow stream and the electrostatic field are designed to draw the fluid jet stream very fast to the ground. The spin-draw ratio depends on many variables, such as the charge density of the fluid, the fluid viscosity, the gaseous flow rate and the electrostatic potential. In some embodiments, these variables can be altered in mid-stream during processing. For example, injection of electrostatic charges can be used to increase the charge density of the fluid or even convert a neutral fluid to a charged fluid. The temperature of the gaseous flow can also change the viscosity of the fluid. The draw forces increase with increasing gaseous flow rate and applied electrostatic potential.

The intimate contact between the gas and the charged fluid jet stream provides more effective heat transfer than that of an electro-spinning process where the jet stream merely passes through the air surrounding the jet stream. Thus, the gas temperature, the gas flow rate, and the gaseous streaming profile can affect and control the evaporation rate of the solvent if the fluid is a solution. The gas temperature can vary from liquid nitrogen temperature to super-heated gas at many hundreds of degrees; the preferred range depends on the desired evaporation rate for the solvent and consequently on the solvent boiling temperature. The streaming profiles are aimed at stabilizing the jet streams and should be similar to those used in melt blowing.

In electro-blowing embodiments, the feeding rate of the polymer solution per spinneret for forming the nanofibrous scaffold may be from about 5 to about 2500 μL/min, typically from about 20 to about 300 μL/min, in embodiments from about 35 to about 150 μL/min. The air blow temperature may be from about 0° C. to about 200° C., typically from about 20° C. to about 120° C., in embodiments from about 25° C. to about 90° C. The air blow rate per spinneret may vary from about 0 standard cubic feet per hour (SCFH) to about 300 SCFH, typically from about 5 SCFH to about 250 SCFH, in embodiments from about 20 SCFH to about 150 SCFH. The electric potential can be from about 1 kV to about 55 kV, typically from about 15 kV to about 50 kV, in embodiments from about 30 kV to about 40 kV, with a typical spinneret to collector distance of about 10 cm.

Where the nanofibrous scaffold is formed by blow-assisted electrospinning, the feeding rate of the polymer solution per spinneret for forming the nanofibrous scaffold may be from about 5 to about 150 μL/min, typically from about 10 to about 80 μL/min, in embodiments from about 20 to about 50 μL/min. The air blow temperature may be from about 0° C. to about 200° C., typically from about 20° C. to about 120° C., in embodiments from about 25° C. to about 90° C. The air blow rate per spinneret may vary from about 0 standard cubic feet per hour (SCFH) to about 300 SCFH, typically from about 5 SCFH to about 250 SCFH, in embodiments from about 20 SCFH to about 150 SCFH. The electric potential can be from about 1 kV to about 55 kV, typically from about 15 kV to about 50 kV, over a typical in embodiments from about 20 kV to about 40 kV, with a typical spinneret to collector distance of about 10 cm.

In other embodiments, nanofibrous scaffolds in accordance with the present disclosure may be formed by solution blowing, which is similar to melt blowing except a polymer solution instead of a polymer melt is used to fabricate the scaffolds. Such techniques are within the purview of those skilled in the art and include the formation of a polymeric material and blowing agent in a single phase, typically a liquid, which is then sprayed utilizing conventional equipment similar to that utilized in electro-blowing, except that an electrical field is not utilized in spraying the liquid. Parameters useful for solution blowing include, for example, the use of very high shear forces obtained by using gas flow at speeds from about one hundredth of the speed of sound to near the speed of sound in air, i.e., about 600 miles per hour.

Where utilized with both a substrate and a polymer/functionalized nanofiller coating, the nanofibrous scaffold may form the middle layer of a three-tier membrane and possess structures similar to those of melt-blown substrates, except with fiber diameters in the sub-micron size range, of the order of about 10 to about 5,000 times smaller in diameter compared with melt-blown substrates. The smaller pore sizes of these electro-spun non-woven membranes, and the inter-connected void volume which these membranes possess, can be used as a scaffold to support a thinner membrane layer, i.e., coating, for ultra-filtration and nano-filtration with much improved throughput.

In some embodiments, the fiber diameter of the fibers making up the nanofibrous scaffold can range from about 1 nm to about 20,000 nm, in embodiments from about 10 nm to about 1,000 nm, typically from about 30 nm to about 300 nm.

The thickness of the nanofibrous scaffold may vary from about 1 μm to about 500 μm, typically from about 10 μm to about 150 μm, more typically from about 30 μm to about 100 μm in thickness.

The nanofibrous scaffold possesses pores or voids which assist in the functioning of the membranes of the present disclosure. The diameter of these voids may range from about 10 nm to about 200 μm, in embodiments from about 50 nm to about 30 μm, typically from about 100 nm to about 10 μm.

The nano-fibrous scaffold, the nonwoven substrate, or optionally a combination of both the nano-fibrous scaffold and the nonwoven substrate may form the basis for the high-flux and low-fouling ultra-filtration membranes of the present disclosure.

The nanofibrous scaffolds are very effective as a support in the ultra-filtration and nano-filtration membrane of the present disclosure because they have an extremely large interconnected void volume and smaller effective hole sizes. As noted above, these nanofibrous scaffolds may be used by themselves as microfilters and coated to form a membrane of the present disclosure or, in embodiments, the nanofibrous scaffold may be combined with a non-woven micro-filter substrate of larger effective pore sizes and fiber diameters, which may then be coated to form a membrane of the present disclosure. This unique combination can effectively reduce the thickness required for the ultra-filtration and nanofiltration membrane and the blockage by the scaffold, thereby greatly increasing the overall throughput. Moreover, the nanofibrous scaffolds can function as an effective filter on their own.

An asymmetric nanofibrous scaffold containing different fiber diameters and porosity can also be used in some embodiments. In this embodiment, the nanofibrous scaffold possesses two different surfaces, which may be referred to in embodiments as a top and bottom surface. The fibers making up the bottom surface of the nanofibrous scaffold may, in some embodiments, have a diameter greater than the fibers making up the top surface of the nanofibrous scaffold. For example, fibers making up the bottom surface of the nanofibrous scaffold may have diameters from about 300 to about 10,000 nm, in embodiments from about 400 to about 2,000 nm, typically from about 500 to about 1,000 nm, while fibers making up the top surface of the nanofibrous scaffold may have diameters from about 5 to about 500 nm, in embodiments from about 15 to about 300 nm, typically from about 30 to about 200 nm. The diameter of fibers found between the bottom surface and top surface will exhibit a gradient in size between the diameters found at the bottom surface and top surface, respectively.

Due to this asymmetry in fiber diameter, such an asymmetric nanofibrous scaffold may be utilized by itself as a membrane of the present disclosure. In other embodiments, an asymmetric nanofibrous scaffold of the present disclosure may be applied to a nonwoven substrate as described above, with fibers of the bottom surface of the nanofibrous scaffold immediately adjacent to a substrate as described above. In other embodiments, a coating of the present disclosure may be applied to the top surface of an asymmetric nanofibrous scaffold of the present disclosure, with smaller diameter fibers of the top surface of the nanofibrous scaffold immediately adjacent to the coating layer. In still other embodiments, as described above, the nanofibrous scaffold of the present disclosure may be present as a middle layer between a nonwoven substrate and a coating of the present disclosure; in such an embodiment, larger diameter fibers of the bottom surface of the nanofibrous scaffold will be immediately adjacent to the substrate and smaller diameter fibers of the top surface of the nanofibrous scaffold will be immediately adjacent to the coating layer.

Figure 2:
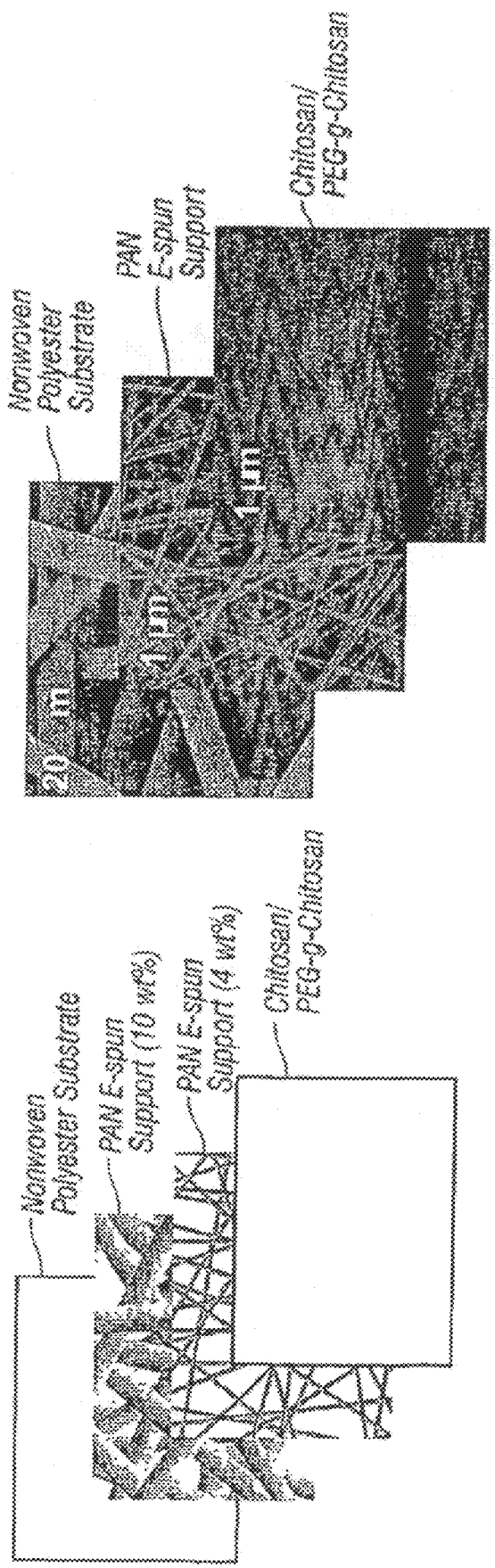
FIG. 2 is a schematic diagram of a high-flux low-fouling filter membrane of the present disclosure showing the general structure (left side of figure) and SEM images of each component utilized in the membrane assembly (right side of figure)

An example of a three-tier asymmetric membrane is depicted in FIG. 2. As can be seen in FIG. 2, in some embodiments the middle layer may include two or more sub-layers prepared from two or more different weight percentage solutions of a polymer or solutions of different polymers to form the middle layer, in which the larger diameter filaments of the middle layer are in contact with the even larger diameter filaments of the non-woven substrate while the increasingly smaller diameter filaments of the middle layer are in contact with the thin top coating layer. For example, both a 4 wt % solution of PAN and a 10 wt % solution of PAN may be electro-spun on a substrate to form an asymmetric nanofibrous scaffold suitable for use in forming a three-tier filtration membrane of the present disclosure.

Where both a nanofibrous scaffold and non-woven microfilter substrate are present in a membrane of the present disclosure, de-lamination can occur between the substrate and scaffold caused by cross-flow dynamics utilized by many ultrafiltration systems in the removal of contaminants. Thus, in some embodiments, in order to enhance the adhesion between the substrate, such as a PET substrate, and the scaffold, such as an electrospun PAN, it may be useful to first coat one side of PET substrate with a solution including water insoluble chitosan, crosslinked PVA, crosslinked polyethylene oxide (PEO), their derivatives and copolymers to enhance adherence of the middle layer to the substrate. As noted above, water soluble materials such as PVA and PEO may be crosslinked with known crosslinking agents, including, but not limited to, glutaraldehyde, glyoxal, formaldehyde, glyoxylic acid, oxydisuccinic acid and citric acid.

In one embodiment, a 0.7 wt % neutralized chitosan (Mv=200,000 g/mol) aqueous solution may be utilized as an adhesive layer between the substrate and scaffold. In such a case, the chitosan or other adhesive may be applied to the substrate utilizing methods within the purview of one skilled in the art including, but not limited to, spraying, dipping, solution casting and the like. Before complete drying of the chitosan coating on the substrate, the scaffold nanofibers of PAN or PVA (from a 10 wt % in DMF) may be electrospun onto the chitosan coated layer at about 2 kV over a distance between the spinneret and the collector of about 10 cm, with a solution flow rate of 25 µl/min. The fiber diameter of electrospun nanofiber scaffold may range from about 150 nm to about 200 nm.

In other embodiments, the nanofibrous scaffold may be subjected to a plasma treatment to enhance its adherence to a substrate and/or coating layer in forming a membrane of the present disclosure. Plasma treatment methods are within the purview of those skilled in the art, including, for example, atmospheric pressure plasma treatment on non-woven fabrics. This method has been demonstrated to be an effective means to improve the wettability as well as the affinity of the fiber surface for dyeing, chemical grafting and substrate adhesion. Plasma activation can produce functional groups and/or free radicals on the fiber surface, which can react with other molecules.

In one embodiment, a plasma treatment may be conducted as follows. The surface of a substrate can be functionalized by subjecting it to an atmospheric-pressure plasma treatment using a surface dielectric barrier discharge in nitrogen gas, ambient air, or other gases such as helium, ammonia, oxygen and/or fluorine. At the same time, the surface of a nanofibrous scaffold may be treated with the same plasma. The resulting plasma-activated substrate may be bound to another substrate, another plasma-activated substrate, a porous scaffold layer, a plasma-activated porous scaffold layer, or a plasma-activated nanofibrous scaffold using a catalyst-free solution of water in combination with acrylic acid, polysaccharides such as chitosan, cellulose, collagen and gelatin, epoxy, or combinations thereof. The plasma treatment can significantly improve the adhesion of a substrate with other layers of the membrane, including any nanofibrous scaffold of the present disclosure or other layer utilized in the formation of membranes of the present disclosure.

In embodiments, membranes of the present disclosure may also include a coating of a very thin, smoothed-surface layer of polymer with a nanofiller having nanoscaled porosity to improve the flux and to reduce the fouling rate of a membrane of the present disclosure. The coating may be applied to a void-directed scaffold or to a nanofibrous scaffold as described above. In some embodiments, a three-tier membrane may be utilized which includes a non-woven microfibrous substrate, a nanofibrous scaffold, and a coating layer.

Depending upon the fluid (or gas) media to be filtered, the polymer utilized to form the coating layer should be fluid-philic. A fluid-philic coating layer should be applied to a fluid-philic substrate and/or a fluid-philic nanofibrous scaffold. Thus, for example, for water filtration (which is obviously hydrophilic), the coating layer should be applied to a hydrophilic substrate and/or a hydrophilic nanofibrous scaffold.

Hydrophilic polymers which may be utilized to form the coating include, but are not limited to, polysaccharides, polyalcohols, polyalkylene oxides, polyimines, polyacrylic acids, polyamides, polyamines, polyurethanes, polyureas, derivatives thereof and copolymers thereof. Specific examples of suitable hydrophilic polymers include chitosan, cellulose, cellulose acetate, collagen, gelatin, polyvinyl alcohol, polyethylene oxide, polyethylene glycol, polyethylene glycol-grafted chitosan, polyethylene glycol-grafted polymethyl methacrylate, polyethylene imine, polyvinylpyrrolidone, poly(ether-co-amide) copolythers, polybenzimidazole, nylon 6, nylon 66, nylon 12, polyallylamine, derivatives thereof and copolymers thereof.

Hydrophobic polymers which may be utilized to form a non-aqueous fluid-philic coating include, but are not limited to, polyolefins, polysulfones, fluoropolymers, polyesters, polycarbonates, polystyrenes, polynitriles, polyacrylates, polyacetates, derivatives thereof and copolymers thereof. Specific examples of suitable non-aqueous fluid-philic polymers that depend on the chemical nature of the fluid include polyethylene, polypropylene, polyethersulfone), polyvinylidene fluoride, polytetrafluoroethylene (Teflon), polyethylene terephthalate, polytrimethylene terephthalate, polybutylene terephthalate, polystyrene, polyacrylonitrile, polymethyl methacrylate, polyvinyl acetate, derivatives thereof and copolymers thereof.

In some embodiments suitable materials for use as the coating of the membrane of the present disclosure include, but are not limited to, chitosan, poly(ether-co-amide) copolymers (sold as PEBAX® and commercially available from DuPont, Atofina), chitosan grafted with polymers such as polyethylene glycol to produce PEG-grafted chitosan, cellulose derivatives, crosslinked PVA, crosslinked PEO, their derivatives and copolymers. Here again, crosslinking agents which may be utilized to crosslink water soluble polymers such as PVA and PEO include, but are not limited to, glutaraldehyde, glyoxal, formaldehyde, glyoxylic acid, oxydisuccinic acid and citric acid.

Nanofillers suitable for use in forming the coating of the present disclosure include both organic nanofillers and inorganic nanofillers. In embodiments, suitable nanofillers include carbon nanotubes including single-walled carbon nanotubes, multi-walled carbon nanotubes and carbon nanofibers, bucky balls (also known as fullerene C60 and/or Buckminster fullerene), graphite nanoparticles, metal nanoparticles or inorganic nanotubes which may contain metallic components including, but not limited to, gold, cobalt, cadmium, copper, iron, lead, zinc, and palladium, as well as silicate based nanoparticles such as silica, polyhedral oligomeric silsesquioxanes, layered silicates, and derivatives thereof.

In embodiments, such nanotubes and other nanofillers, including metal nanoparticles, may be functionalized, including (1) covalent functionalization such as by oxidation, ozonation, halogenation (e.g. chlorination, fluorination and bromination), hydrogenation, thiolation, esterification, addition of radicals, addition of nucleophilic carbenes, electrophilic addition, cycloadditions (e.g. carbenes, nitrenes, nucleophilic cyclopropanation) and electrochemical functionalization of the nanotube surface, and (2) non-covalent functionalization such as by supramolecular complex formation using various adsorption forces including electrostatic, van der Waals' and p-stacking interactions.

In some useful embodiments, the nanofiller may be functionalized by chemical grafting of a monomer or oligomer of the polymer comprising the coating. The functionalized nanofillers demonstrate good adhesion with the polymer matrix forming the coating layer.

In embodiments, the nanofiller may be functionalized with at least one hydrophilic functional group including, but not limited to, carboxylic acid groups, carbonyl groups, hydroxy groups, ethylene oxides, alcohols, saccharides and amine groups or supramolecular complexes including DNA molecules, DNA fragments, and protein fragments. Suitable DNA molecules may include those obtained from plants, animals and human, sources being, in some embodiments, from about 1 to about 1000 nucleotides in length, in embodiments from about 10 to about 100 nucleotides in length.

In other embodiments, the nanofiller may be functionalized with at least one hydrophobic functional group including, but not limited to, aliphatic compounds including linear molecules containing hydrocarbons having from about 1 to about 20 carbon atoms, e.g., octadecylamine (ODA)), polypropylene-graft-maleic anhydride oligomers (including one having a Mn of about 3,900 g/mol, a Mw of about 9,100 g/mol, and an acid number of about 47 mg KOH), fluorinated compounds, including 3-(perfluorooctyl)propylamine and the like), and aromatic compounds including aromatic hydrocarbons, e.g. alkylidenediamines such as hexamethylenediamine and the like.

Nanofillers utilized in forming the coatings of the present disclosure may have varying morphologies, from rod-like or cylindrical, to spherical, to bucky balls (a soccer ball type configuration combining pentagons and hexagons). Thus, in some embodiments, the diameter of a functionalized nanofiller utilized in forming a coating of the present disclosure may be from about 0.3 nm to about 300 nm, in embodiments from about 0.5 nm to about 50 nm, typically from about 1 nm to about 30 nm. Where the functionalized nanofiller is rod-like or cylindrical in shape, it may have a length of from about 1 nm to about 500 microns, in embodiments from about 100 nm to about 50 microns, typically from about 500 nm to about 5 microns.

Where the nanofiller is a carbon nanotube, such as a single-walled carbon nanotube, a multi-walled carbon nanotube, and/or a carbon nanofiber, the diameter of such a nanofiller may be from about 1 nm to about 300 nm, in embodiments about 5 nm to about 200 nm, typically about 10 nm to about 100 nm.

The nanofiller may be present in the coating in an amount of from about 0.1 percent by weight to about 95 percent by weight of the coating, in embodiments from about 0.2 percent by weight to about 30 percent by weight of the coating, typically from about 0.5 percent by weight to about 20 percent by weight of the coating. Conversely, the polymer may be present in the coating in an amount of from about 5 to about 99.9 percent by weight of the coating, in embodiments from about 70 percent by weight to about 99.8 percent by weight of the coating, typically from about 80 percent by weight to about 99.5 percent by weight of the coating.

The incorporation of functionalized nanofillers in the coating layer may improve the mechanical strength of the coating layer, and may increase the fluid permeability of the coating layer. For example, coating layers having modified carbon nanotubes as the functionalized nanofiller in an amount from about 1 percent by weight to about 10 percent by weight may, in embodiments, be from about 50% to about 300% stronger in toughness (the toughness was estimated by the area under the stress-strain curve) than coatings without the nanofillers, and may exhibit an increase in flux rate (with the same rejection rate) that is from about 50% to about 1000% greater than coatings without the nanofillers.

A coating layer of the present disclosure may have a thickness<1 µm, in embodiments from about 1 nm to about 4,000 nm, in some embodiments from about 10 nm to about 1,000 nm, typically from about 20 nm to about 300 nm.

The coating layer may have a porosity, that is pores or nanochannels which form at the interface between the functionalized nanofiller and the polymer of the coating layer, of from about 0.2 nm to about 30 nm, in embodiments from about 0.4 nm to about 10 nm, typically from about 0.5 nm to about 5 nm. The channel size may be regulated by the grafted chain length of fluid-philic oligomers and the degree of functionalization of the nanofiller, such as by oxidation or ozonation of a carbon nanotube, and thereby be used to manipulate the permeability and selectivity of the coating layer.

The number of functionalized nanofillers present in the coating may vary, from about 1 to about 5 different nanofillers, in embodiments from about 2 to about 4 different nanofillers.

Methods for applying the coating layer are within the purview of one skilled in the art and include, for example, dipping or a two-step coating method combining the dipping and thin film deposition. Other methods known to those skilled in the art which may be utilized to apply a coating layer include film casting.

Filtration media in accordance with the present disclosure may be utilized for filtering numerous substances from fluids. Some applications include, but are not limited to, filtration of bilge water, filtration of produced water, and desalinization to remove salt from salt water. For filtration of bilge water or produced water, and to prevent entrapment or accumulation of organic molecules and dirt particles at the surface, the top coating layer of the filtration media should have pore sizes comparable to the size of oil molecules or dirt particles and the layer should also be hydrophilic. In addition, as the filtration system, i.e., utilizing ultrafiltration media, nanofiltration media, and the like, is mostly utilized under cross-flow filtration conditions, the mechanical stability of the coating layer and its durability are also important.

In addition to the substrates and nanofibrous scaffolds described above, the coatings of the present disclosure may be applied to other substrates suitable for use as ultrafiltration or nanofiltration membranes including, but not limited to, those possessing a foam-like structure made of polymeric materials such as polysulfones, cellulose acetates, polyvinylidene fluoride (PVDF) and polyamides. Such materials may have a porosity from about 10% to about 90% in volume, in embodiments from about 30% to about 75% in volume.

In yet other embodiments of the present disclosure, nanofibrous scaffolds of the present disclosure may include nanofillers, including those described above for use in a coating of the present disclosure. Amounts of these nanofillers in the nanofibrous scaffold may vary from about 0.01% by weight to about 70% by weight of the nanofibrous scaffold, in embodiments from about 0.1% by weight to about 5% by weight of the nanofibrous scaffold.

In one embodiment, the membranes of the present disclosure include electrospun nanofibrous scaffolds of poly(acrylonitrile) (PAN) or polyvinyl alcohol (PVA) on the surface of a commercial substrate (non-woven PET micro-filter (fiber diameter ~10 µm), FO2413, Freudenburg Nonwovens).

A three-tier composite filter of the present disclosure thus has several advantages compared with commercially available filters. The very thin and smooth top layer can reduce the entrapment and accumulation of oil and surfactant molecules and dirt particles at the surface of the filter and facilitate the removal of these contaminants by solution and pure water washing.

The electrospun nanofibrous scaffold has an extremely large inter-connected void volume and very small average hole sizes. These qualities make the scaffold suitable for support of a thin top layer. The combination of a top layer and electro-spun nanofibrous scaffold can thus reduce the total thickness required for ultra-filtration and thereby greatly increase the overall throughput (flux). The nanofibrous scaffold is thus a more effective support for the top coating layer with a thinner thickness than that of a foam layer with equivalent porosity.

With appropriate matching of the mechanical and nanostructural properties among the membrane, electro-spun scaffold and melt-blown substrate, high throughput and low-fouling filters have been designed, constructed, and successfully tested. The filtration membranes of the present disclosure, based on nano-fibrous scaffolds, showed significant flux improvement, 5-10 times more flux than commercial ultrafiltration devices.

In order that those skilled in the art may be better able to practice the features of present disclosure described herein, the following examples are provided to illustrate, but not limit, the features of the present disclosure.

Example 1

Formation of a polyacrylonitrile mid-layer. Polyacrylonitrile (PAN, Mw~150,000)/dimethylformamide (DMF) (10 wt %) solution was used to fabricate the porous mid-layer for a filter in accordance with the present disclosure. The electrospinning parameters were as follows: the applied voltage was about 14 to about 20 kV; the flow rate was about 10 to about 20 μl/min; the spinneret diameter was about 0.7 mm; the distance between the collector (PET substrate) and the spinneret was about 10 to about 18 cm. In order to control the porosity of the electro-spun membrane and to make it easier to support the top-layer coating, it was desirable to change the electrospun fibers' diameter within the range of physical limits (e.g., close to entanglement concentration or solubility limit). Various concentrations (about 4 to about 12 wt % in DMF) of PAN solutions were used for controlling PAN e-spun fiber diameters. The sizes obtained from the various solutions are summarized in Table 1 below.

TABLE 1

E-spun fiber diameter changes with respect to concentrations.

| | 4 wt (%) | 6 wt (%) | 8 wt (%) | 10 wt (%) | 12 wt (%) |
|---|---|---|---|---|---|
| Average Diameter* (nm) | 124 | 280 | 682 | 720 | 763 |

*±50%

Example 2

Improved bonding between electrospun layer and microfibrous substrate. One side of a PET substrate, FO2413 (commercially available from Freudenburg Nonwovens (Hopkinsville, Ky.) and having fiber diameter of about 10 μm), was coated with 0.7 wt % of neutralized chitosan (Mw=200,000 g/mol) aqueous solution. Before complete drying of the chitosan coating on the substrate, PAN solution (10 wt %) was directly electro-spun onto the chitosan coating layer. After electro-spinning of PAN, the composite ultra-filter (microfilter/electro-spun PAN hybrid) was vacuum dried at room temperatures for 2 days.

The resulting membranes were subjected to a cross-flow filtration apparatus, based on a standard filtration instrument from Pall Corp. used by the UF industry. This instrument provided the following test ranges:
1. Filter size: 2.75 in×3.75 in
2. Pump capacity: 1.25 Gallon/minute (GPM). It can develop a pressure of up to 500 psi
3. The size of inlet, outlet, and permeation slits is 0.065 in×2.25 in.
4. Actual pressure under operating conditions has been tested up to 180 psi.

It was found that the use of the chitosan coating on the PET substrate improved the adhesion between the PET and PAN layers under cross-flow conditions.

Example 3

Design and Testing of High Flux Membranes Based on Nanofibrous Scaffolds. Electro-spun membranes of poly (acrylonitrile) (PAN) using different thicknesses (50-300 μm) were fabricated as the mid-layer membrane and applied to a PET-type substrate treated with chitosan as described above in Example 2.

The following materials were utilized in preparing the nanofibrous membranes.

(A) Polyester substrate: Non-woven PET micro-filter (FO2413, Freudenburg Nonwovens). The average fiber diameter in this substrate was about 10 μm.

(B) PAN (polyacrylonitrile) from Aldrich was used to fabricate nano-fibrous scaffolds using the electro-spinning method as follows. 8-10 wt % of PAN solution was prepared in DMF. The PAN solution was electro-spun on the surface of PET substrate at 18 kV with a solution flow rate of 25 μl/min. The thickness range of electro-spun PAN was from 50 μm to 300 μm.

(C) Two commercial ultra-filtration (UF) membrane systems were selected to compare the flux performance with the nano-fibrous membranes of the present disclosure. The chosen commercial UF systems were: (1) VSEP (from New Logic Research); and (2) Pre-Tec UF filtration, (from Pre-Tec Co.): the test was conducted by 0.5×102 L/m$^2$·h by ink wash-up water.

Figure 3:
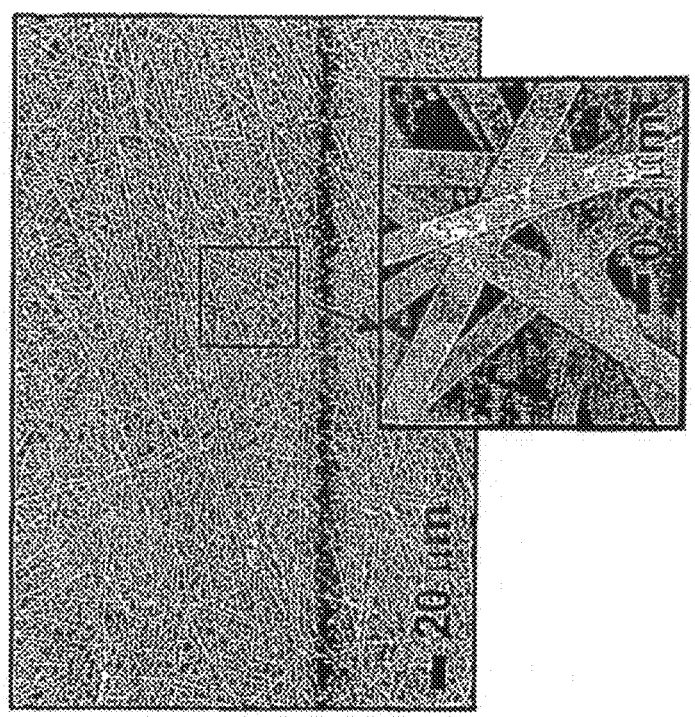
FIG. 3 is a graph showing the flux comparison between nano-fibrous membranes of the present disclosure and commercial UF membranes, as well as a SEM image of the middle layer of a UF membrane of the present disclosure.
Figure 3:
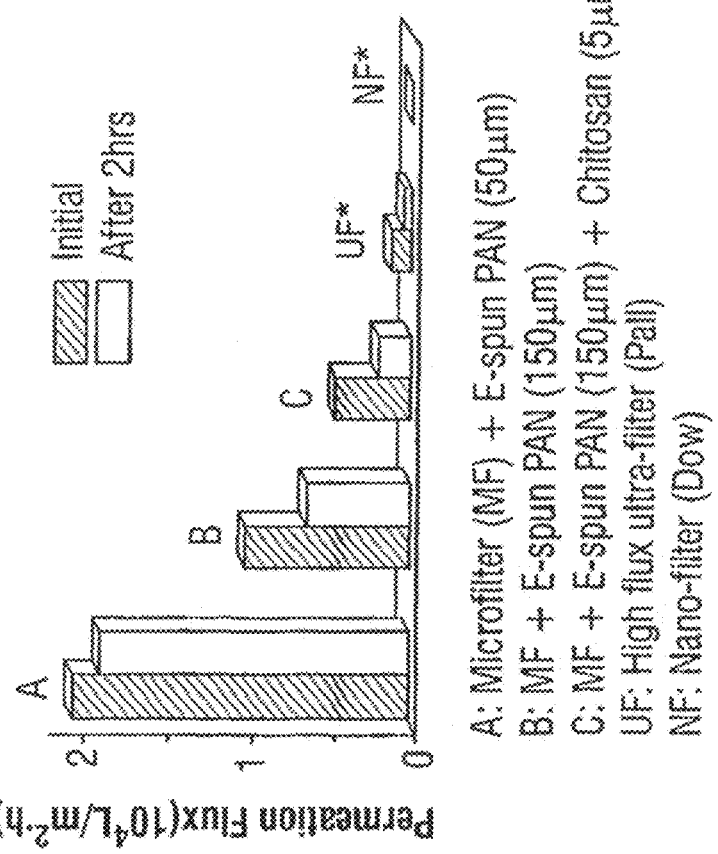

The flux test of our nano-fibrous membranes and commercial UF membranes was carried out using the cross-flow device described above in Example 2 with laboratory-distilled water (water contained some dust). The results are summarized in FIG. 3. FIG. 3A shows a PET micro-filter substrate+electro-spun PAN (50 μm) bi-layer filter without the coating layer; FIG. 3B shows a PET micro-filter substrate+electro-spun PAN (150 μm) bi-layer filter without the coating layer; FIG. 3C shows a PET micro-filter substrate+electro-spun PAN (150 μm) with a chitosan coating layer (about 5 μm). As is apparent from FIG. 3, the PAN nanofibrous scaffold/PET micro-filter composite membranes (uncoated and coated with about 5 μm of chitosan) showed a substantial flux improvement over the existing commercial UF filters in water flow.

The composite filter (non-woven PET micro-filter/electro-spun PAN bi-layer filter) without the coating layer was mechanically stable at high water pressures (ca. 120 psi) and exhibited high flux filtration performance in a cross-flow test (medium: lab-distilled water). The flux of composite filter (6,500-20,300 L/m$^2$·h) was 13-16 times larger than that of the commercial high-flux ultra-filtration (UF) filter membrane (500-1,300 L/m$^2$·h). Thus, the bi-layer composite filter was an effective filter itself based on oily waster water filtration test.

Even the flux of the non-optimal thickness three-tier filter (micro-filter (150 μm support)/electro-spun PAN (150 μm mid-layer)/chitosan (5 μm coating layer)) was 2,000-4,800 L/m$^2$·h, and it was still better than the 200 μm thick commercial high-flux UF filter membrane.

The electro-spun PAN mid-layer had an extremely large inter-connected void volume (~80%) and thus its use in the filter membranes of the present disclosure reduced the thickness required for ultra-filtration membrane and thereby greatly increased the overall throughput.

Example 4

Additional testing was conducted on the above-described filter membranes of Example 3 using oily waste water (1350 ppm of soybean oil and 150 ppm of nonionic surfactant (Dow Corning 193 fluid) in water). The results of these tests indicated that the composite membranes were an effective filter when used alone. Even when the wastewater concentration was changed from 1,500 ppm to 540 ppm after filtration through the composite filter, the filtration flux remained high.

Example 5

Evaluation of Nanofibrous Membranes with Chitosan Coating. Chitosan (Mv~250,000, 80% deacetylated) was used for the top-coating layer of a filter membrane utilizing the following procedures. Chitosan was dissolved at certain concentration ranges (after neutralization: 0.5~1.5 wt %) using acetic acid (99.5%) and subsequently neutralized by 1 N NaOH until pH~6.5. Dip-coating of the PET/PAN bi-layer membranes described above in Example 3 (such as those described in FIGS. 3A and B, but having different nanofibrous layer thickness) in the chitosan solution was utilized to form a coating layer. The top-coating layer thickness was found to be related to the thickness of the electro-spun layer, i.e., the thicker the electro-spun layer, the thinner the top-coating layer can be. The top-layer thickness thus could be precisely controlled in order to achieve a high flux. If the coating was too thick, the flux would be lower. If the coating was too thin, filtration efficiency would suffer.

Figure 4:
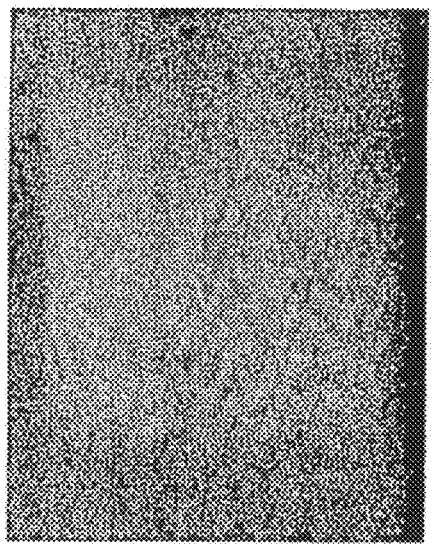
FIG. 4 provides SEM images of the surface features of two-coating layers using 6 wt % polyacrylonitrile (PAN) to produce e-spun layers utilized in forming membranes of the present disclosure.
Figure 4:
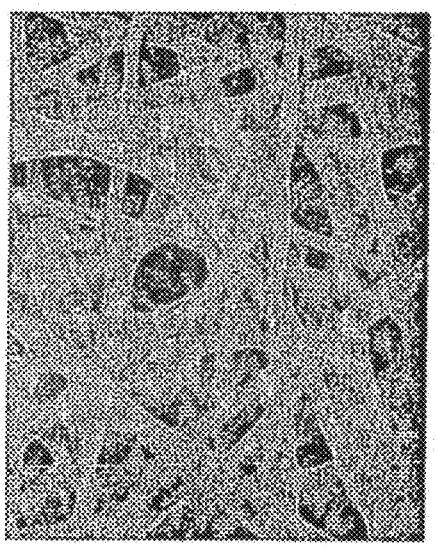
Figure 4:
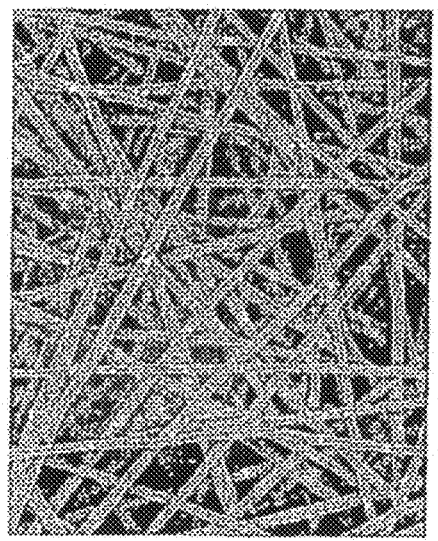

In order to obtain a uniform coating layer, it was necessary to coat several times with the aid of a concentration gradient. SEM surface images of a two-layered coating system are illustrated in FIG. 4, where the PAN membrane was soaked in water, first coated with 0.5 wt % chitosan solution and then with 1.5 wt % chitosan solution.

Cross-flow measurements of this membrane system were carried out using oily waste water (1350 ppm of soybean oil and 150 ppm of nonionic surfactant (Dow Corning 193 fluid) in water). A custom-built cross-flow filtration cell (active filtration area: 0.006515 m$^2$) was used to test the filtration performance of composite membranes. The chosen trans-membrane pressure (Δp) was 50 psi and the chosen inlet pressure was 130 psi, which was maintained constant throughout the entire experiment. The chosen operating temperatures were 30-33° C. The flux measurements were repeated three times to confirm the performance of each sample.

The filtration efficiency of the composite membrane was determined as follows. The surfactant concentrations of the initial feed solution and the filtered liquid (permeate) were determined by ultraviolet-visible (UV) spectroscopy (Bio-Rad SmartSpec 3000) at a wavelength of 230 nm (i.e., in the range of 150 ppm to 0 ppm oil-surfactant mixture). The rejection percent was calculated by using the following equation:

$$\text{Rejection (\%)} = \frac{(C_f - C_p)}{C_f} \times 100$$

where $C_f$ and $C_p$ represent the surfactant concentration of the feed solution and that of the permeate, respectively.

Figure 5:
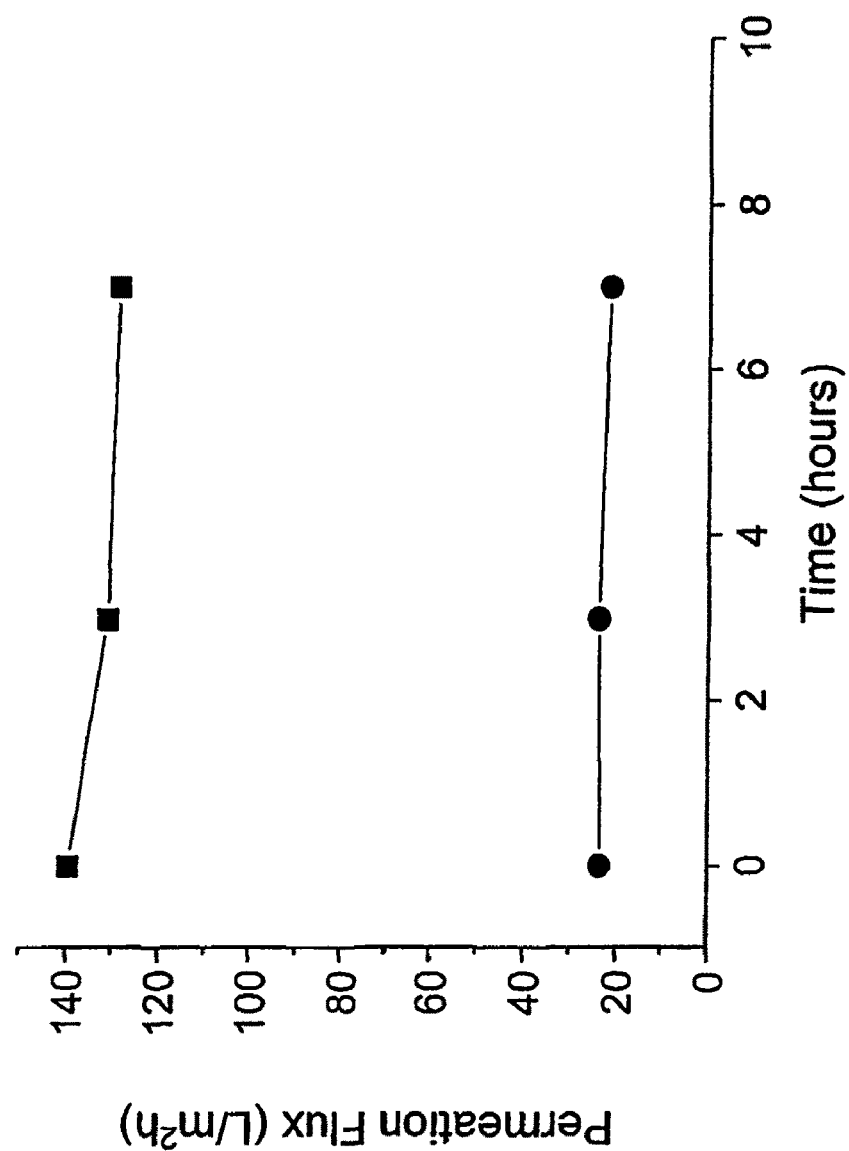
FIG. 5 is a graph showing the flux of a composite membrane of the present disclosure (top) compared with a commercial ultrafiltration membrane (bottom)

It was found that the flux was almost 7 times larger in the membrane filter of the present disclosure than the commercial UF membrane (FIG. 5). The filtration efficiency was evaluated by UV-VIS spectroscopy (absorbance at 230 nm). A calibration curve of waste oily water in the range of 0 to 100 ppm was used to determine the concentration of impurities in water. The Results are summarized in Table 2 below. From the rejection percent data, the three-tier composite membrane of the present disclosure had rejection (%) values comparable to the commercial membrane, but with a 7-time faster flux rate.

TABLE 2

Filtration test results based on rejection (%) and concentration

|  | Rejection* (%) | Concentration (ppm) |
| --- | --- | --- |
| Commercial UF membrane | >99 | <5 |
| Three-tier composite membrane (MF/PAN/Chitosan) | >98.9 | 17 |

*(total organic content (1500 ppm)-filtered waste water value (ppm))/(total organic content (1500 ppm)) × 100 (%)

Example 6

Synthesis of PEG-grafted Chitosan as Coating Materials. As noted above in Example 5, chitosan, a very cheap and hydrophilic material, has shown good promise to improve the fouling properties of filtration membranes. However, chitosan (CHN) can only be dissolved in acid-conditioned water. In order to improve its poor solubility and flexibility and to prevent protein absorption, hydrophilic poly(ethylene glycol) (PEG) was grafted on the backbone of chitosan (PEG-g-CHN). In addition, as PEG molecules can prevent protein adhesion, the grafting of PEG improved the anti-bio-fouling properties of modified chitosan.

Figure 6:
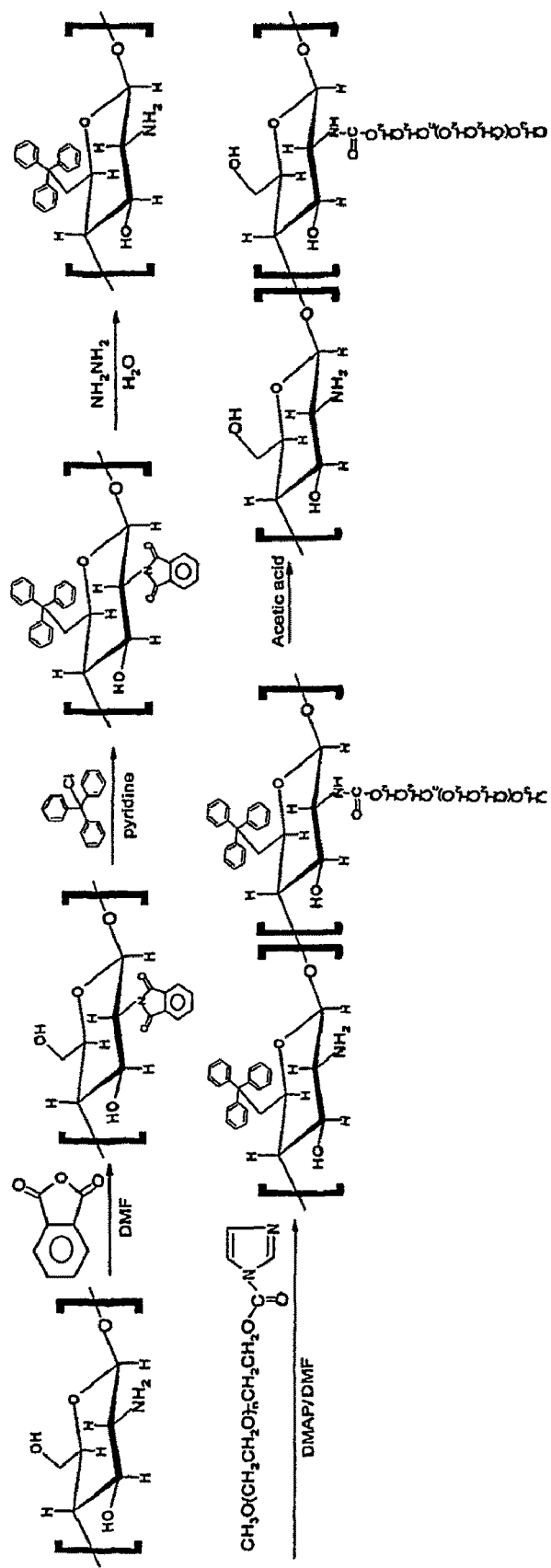
FIG. 6 is a diagram of synthetic schemes for the preparation of polyethylene glycol grafted chitosan (PEG-g-CHN) copolymer, which may be used as a coating in the membranes of the present disclosure.

PEG-grafted chitosan, once prepared, can be used as a coating layer on the surface of nano-fibrous membranes of the present disclosure. FIG. 6 depicts a general scheme to prepare PEG-g-CHN copolymers. Chitosan was modified by phthalylation of its amino groups, triphenylmethylation of its hydroxyl groups, and subsequent deprotection of amino groups to generate the chitosan analog soluble in organic solvents. The hydroxyl group at one end of methyl-PEG was activated with carbonyldiimidazole (CDI), and was conjugated to chitosan using dimethylaminopyridine as a catalyst. The PEG-g-triphenylmethyl-chitosan formed was deprotected to give PEG-g-CHN. The un-reacted PEG was removed by dialysis (MW cutoff 10,000). The PEG content in the copolymer could be adjusted by changing the [activated PEG]:[triphenylmethyl-chitosan] feed ratio.

Using this synthetic scheme, the graft level of PEG to chitosan could reach as high as 50% and the PEG-g-CHN copolymer would became soluble in both water and organic solvents such as DMF, chloroform, etc. The resulting PEG-g-CHN copolymer can then be utilized in the coating layer of a filter membrane of the present disclosure, coating a PET/PAN composite as described above.

Example 7

Preparation of PVA Nanofibrous Scaffold. Polyvinyl Alcohol (PVA) powder ($M_w$=78,000 g/mol, 98% hydrolyzed) was obtained from Polysciences Inc. (Warrington, Pa.); Triton X-100, gutaraldehyde (GA) (50% aqueous solution) and hydrochloric acid (36.5% aqueous solution) were obtained from Aldrich Chemical (Milwaukee, Wis.).

A PVA solution was prepared by dissolving PVA powder in distilled water at 90° C. under constant stirring for at least 6 hours. When the solution was cooled to room temperature, Triton X-100 was added to the PVA solution at a concentration from about 0.02 to 1.2 v/w %. The mixture was stirred for 15 minutes before electrospinning. The concentration of the PVA solution ranged from 8 wt % to 15 wt %. Triton X-100 surfactant was used to lower the surface tension, which stabilized the PVA during electrospinning. Electrospinning was conducted as described above in Example 1.

To achieve fast and stable electrospinning conditions for the fabrication of thin and uniform PVA nanofibers, a series of experiments with PVA/Triton solutions of different concentrations/compositions were carried out (e.g. concentration of the PVA solution was from 8 wt % to 15 wt % and Triton X-100 concentration ranged from 0.02 and 1.2 v/w %). The electrospinning experiment was operated under a constant voltage of 30 kV with a spinneret-to-collector distance of 10 cm and a spinneret pore diameter of 0.75 mm.

For 10 wt % PVA solution, the electrospinning operation was fairly stable with a relatively high feeding rate of 35-40 μl/min, when the surfactant concentration was above 0.5 v/w % in the PVA solution. This feeding rate was more than two times higher than that obtainable for PVA electrospinning without the presence of surfactant (15 μl/min). The average diameter of the PVA fiber was increased from 120 to 500 nm with the increase in PVA solution concentration from 8% to 15% when the surfactant concentration was maintained at about 0.6% v/w %.

Figure 7:
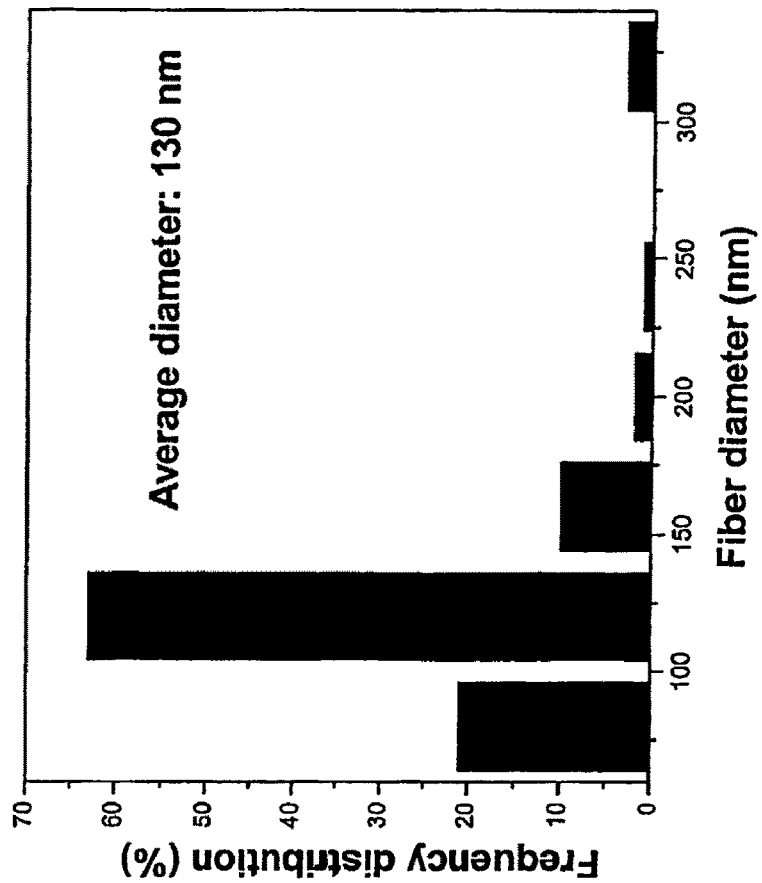
FIG. 7 is a frequency distribution of PVA fiber diameter.

FIG. 1B shows a representative SEM image of a PVA electrospun substrate (10 wt % PVA with 0.6 v/w % surfactant concentration at an applied voltage of 30 KV and the spinneret-to-collector distance of 10 cm). The frequency distribution of the fiber diameter is presented in FIG. 7, where the average diameter of the fibers was about 130 nm.

Example 8

Crosslinking of Electrospun PVA Substrate. As PVA nanofibers can be instantly dissolved in water, the substrate produced from the electrospun PVA nanofibers of Example 7 were crosslinked. The crosslinking procedures were as follows. The electrospun PVA layers produced in Example 7 were immersed in acetone with a 0.01N HCl (36.5% aqueous solution of HCl) and a glutaraldehyde aqueous solution (50 wt %) for 24 hours. The concentration of glutaraldehyde was varied from about 0 to about 60 mM. The crosslinked PVA layer was taken out and washed in the crosslinking solvent several times and then kept in water before use.

To determine the solubility and water absorbency of crosslinked PVA nanofibrous substrates, the gravimetric method was used. Five pieces of electrospun samples were immersed in water for 48 hours, dabbed dry with filter paper and weighed immediately ($W_s$), then dried in vacuum at room temperature for 24 hours and weighed again ($W_d$). The initial weight of each sample was $W_0$. The weight loss (r) and the water content (q) of the samples were calculated using the following equations:

Weight loss percentage$(r) = (W_0 - W_d)/W_0 \times 100$

Swelling degree$(q) = (W_s - W_d)/W_d$

Figure 8:
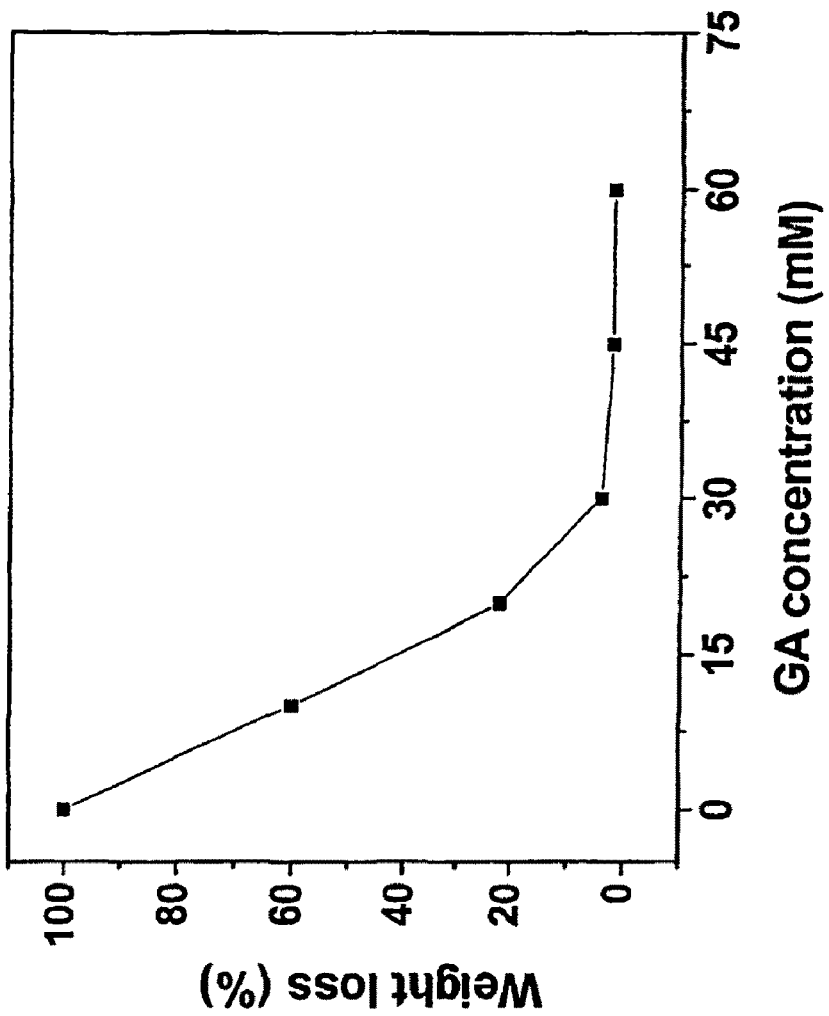
FIG. 8 is a graph depicting the effects of glutaraldehyde (GA) concentration on the crosslinking of PVA fibrous membranes in acetone at room temperature for 12 hours.
Figure 9:
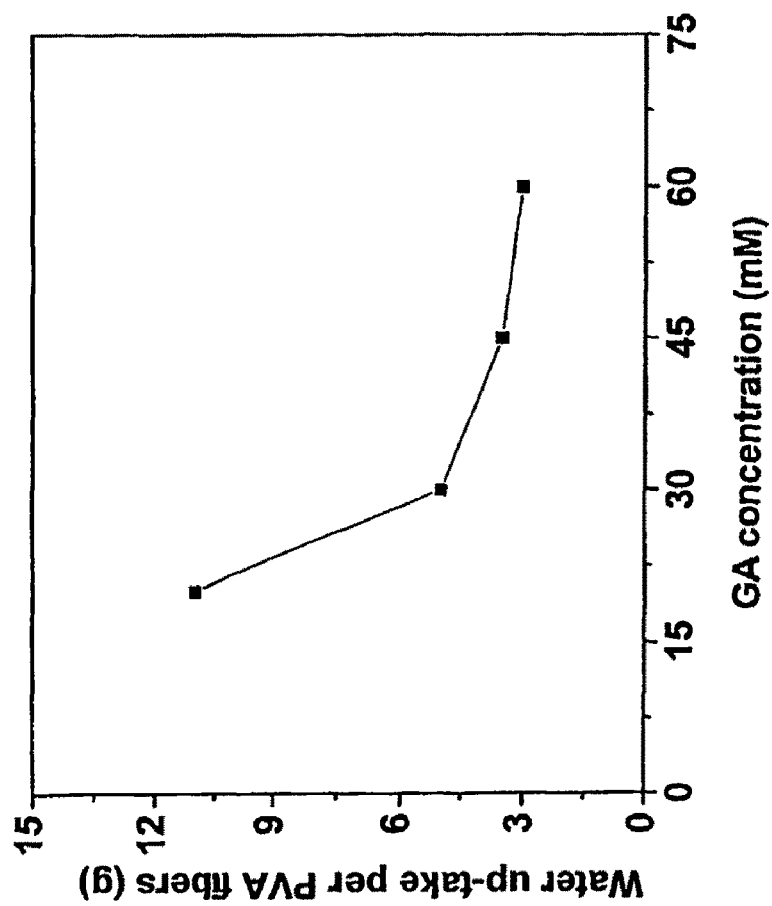
FIG. 9 is a graph depicting the water uptake per gram of the electrospun PVA substrate crosslinked at different GA concentration.

The swelling experiment was used to measure qualitatively the extent of crosslinking of electrospun PVA layers. During the swelling test, some parts of the PVA electrospun substrate were dissolved in water depending on the crosslinking conditions. FIGS. 8 and 9 show the weight loss and the water uptake by the PVA electrospun substrate as a function of the glutaraldehyde concentration used in the crosslinking process. As seen in FIG. 8, the weight loss decreased with increasing glutaraldehyde concentration. There was no evidence of weight loss when the glutaraldehyde concentration was higher than 30 mM. The swelling, expressed as grams of water uptake per gram of PVA layer, was used as a measure of the crosslinking density. FIG. 9 shows that the water content in the fibrous substrates decreased with increasing glutaraldehyde concentration, indicating an increase in the crosslinking density of the PVA fibrous substrates.

The density of the crosslinked electrospun PVA layer was determined from an average of the five samples using mass divided by volume of the sample. The porosity of each substrate was calculated by using the following equation:

Porosity = $(1 - \rho/\rho_0) \times 100$ where $\rho$ is the density of electrospun substrate and $\rho_0$ is the density of bulk polymer.

Conventional polymer separation membranes prepared by the phase immersion method often exhibit relatively low surface porosity (about 1% to about 5%) and broad pore size distribution that can result in low diffusive flux and high fouling. The non-woven nanofibrous structure produced by electrospinning generated high porosity with small pore sizes (microporous). The pores in the electrospun substrate were fully interconnected to form a three-dimensional network, leading to a high filtration flux.

The fiber diameter of the electrospun PVA layer was in the range of 150-300 nm. More importantly, the average porosity of the substrate was 84% and 82% before and after crosslinking, respectively.

Shrinkage of the substrate was also tested. For the shrinkage test, the crosslinked electrospun PVA layer was washed in acetone several times and kept under negative pressure in a hood for 1 hour to remove any residual acetone in the substrate before measuring the size of the sample. The shrinkage percentage of the electrospun PVA layer was defined as the ratio of the surface dimensional differences of the electrospun substrate before and after crosslinking divided by the initial surface dimensions (before crosslinking). No apparent shrinkage was observed when PVA layers were immersed into the above crosslinking solution.

Example 9

The mechanical properties of electrospun PVA layers were determined using an Instron (4442) tensile tester at ambient temperature with a gauge length of 10 mm and a crosshead speed of 2 mm/min. The specimens were cut along the nanofiber winding direction with a typical size of 20 mm (length)×5 mm (width), and a thickness of about 100 μm.

Figure 10:
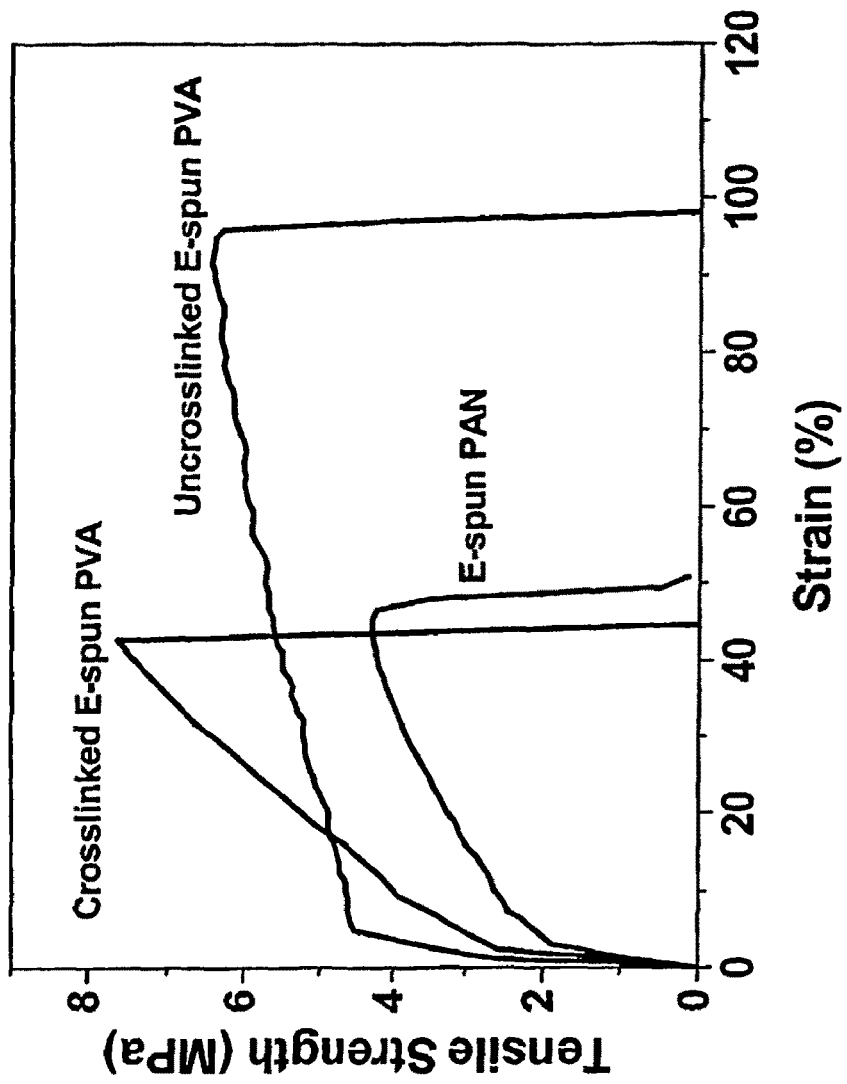
FIG. 10 is a graph depicting stress-strain curves of electrospun nanofibrous substrates.

The tensile strength and strain curves of PVA electrospun substrates before and after crosslinking are shown in FIG. 10. It was found that the strength at break of the substrate increased, while the elongation to break decreased after crosslinking. This can be explained as follows. The linear polymer chains in the non-crosslinked nanofibers can easily slide by one another during tensile deformation, resulting in low tensile strength and high elongation. However, for the three-dimensionally crosslinked PVA nanofibers, the chains were tightly connected by covalent bonds, whereby the chain sliding became more difficult. Therefore, the crosslinked PVA layers had higher tensile strength and lower elongation. For comparison, the mechanical performance of electrospun polyacrylonitrile (PAN) substrate with a fiber diameter of about 200 nm and a substrate thickness of about 100 μm is also shown in FIG. 10. As can be seen, the crosslinked electrospun PVA layer shows a very good overall mechanical property as compared with that of the electrospun PAN nanofibers of a similar molecular weight and fiber diameter.

Example 10

A multi-walled carbon nanotube (MWNT) with an average diameter of 20-40 nm was obtained from Nanostructured and Amorphous Materials Inc. (Houston, Tex.). The MWNTs were oxidized by a concentrated $H_2SO_4/HNO_3$ (1:3) solution to improve their compatibility with polymers. The surface acidic groups generated through oxidation, including carboxylic acid (—COOH), carbonyl (—C=O) and hydroxy (—OH) functional groups, were confirmed by FT-IR spectroscopy. The acidic group value (expressed as mmol/g) was used as an indicator of the surface group density. The acidic group value for the oxidized MWNTs was 1.8 mmol/g by acid-base titration, which means that about every 50 carbon on the MWNT (in bulk) had one carboxylic acid group that was grafted (the ratio of the carboxylic group and the unmodified carbon was higher on the MWNT surface). After chemical etching, the surface-oxidized MWNTs could be dispersed well in distilled water, ethanol, 1-propanol, 1-butanol, tetrahydrofuran, acetone, N,N'-dimethylformamide, or other organic solvents.

Example 11

Preparation of Ultrafiltration Composite Membrane. PEBAX® 1074 (polyethylene oxide (PEO)-block-polyimide 12 copolymer) was supplied by Atofina. The PEO content in this material was 55 wt %, giving a high hydrophilicity to the polymer.

1.0 wt % PEBAX® 1074 solutions in 1-butanol were prepared by refluxing PEBAX® in butanol for 24 hours. An aqueous solution containing 2.0 wt % PVA (pH ~2, adjusted by hydrochloride acid) was also prepared.

The surface-oxidized MWNTs prepared in Example 10 were dispersed at a concentration from about 0 to about 20 wt % of the polymer in 1.0 wt % PEBAX® solution or in 2.0 wt % PVA solution to form a uniform suspended solution. A small amount of glutaraldehyde (about 15 to about 60 mM) was added into the PVA coating solution just before the coating experiment for slight crosslinking of PVA. The time needed for PVA gel formation was about 15 minutes and was controlled by the amount of glutaraldehyde added.

The tested ultrafiltration composite membrane was constructed using the electrospun PVA layer of Example 7 was crosslinked under the following conditions: 30 mM glutaraldehyde in acetone at 25° C. for 24 hours. The morphology of electrospun PVA nanofibrous layers was examined using scanning electron microscopy (SEM, LEO 1550, LEO, USA) after gold coating of the sample. SEM images of the composite membrane cross-section were also obtained, after fracture in liquid nitrogen.

Figure 11:
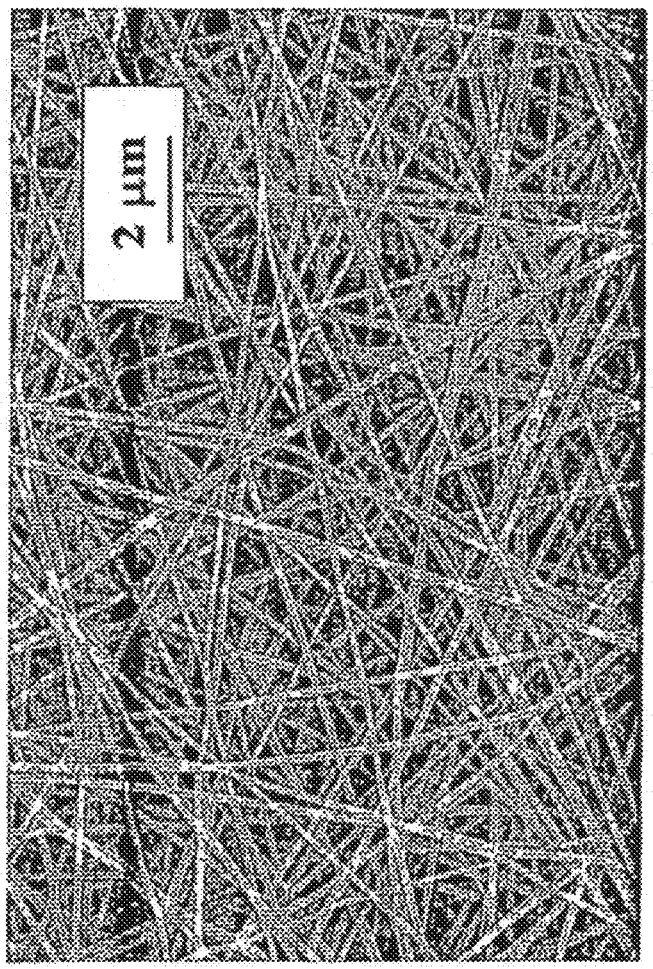
FIG. 11 is a SEM image of crosslinked electrospun PVA substrate.

FIG. 11 shows the SEM image of such a crosslinked electrospun PVA layer (soaked in water for two days then dried in vacuum). As observed, there was almost no change in the fiber diameter (~130 nm) in comparison with those before crosslinking (FIG. 1B). There was almost no shrinkage after crosslinking. The surface of the crosslinked substrate was very flat and smooth.

Figure 1A:
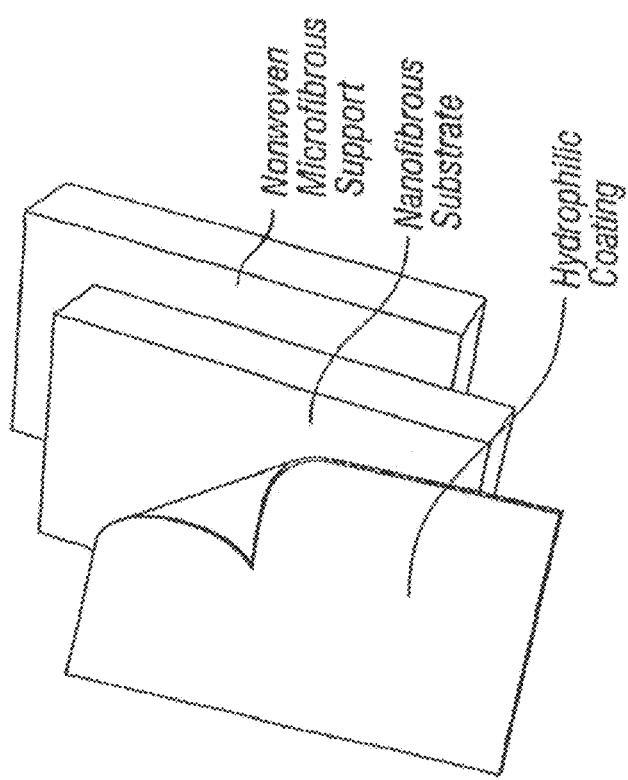

Composite membranes were prepared by the coating method according to the following sequence: the crosslinked electrospun PVA layer described above was placed on a polyester non-woven microfibrous substrate (PET microfilter FO2413 from Freudenburg Nonwovens). The average fiber diameter of the PVA layer was about 10 µm. The PVA layer was rinsed with $H_2O$ followed by 1-butanol, and then coated with the polymer/MWNT solution. The construct was then covered to allow for slow solvent evaporation, and dried under ambient conditions until a constant mass was achieved. The schematic diagram of the three-tier composite membrane is shown in FIG. 1A. For the swelling test of the coating layer, free-standing films of PEBAX® 1074 and PVA were also prepared from 1.0 wt % PEBAX® and 2.0 wt % PVA solutions (with crosslinking agent), respectively.

Figure 12:
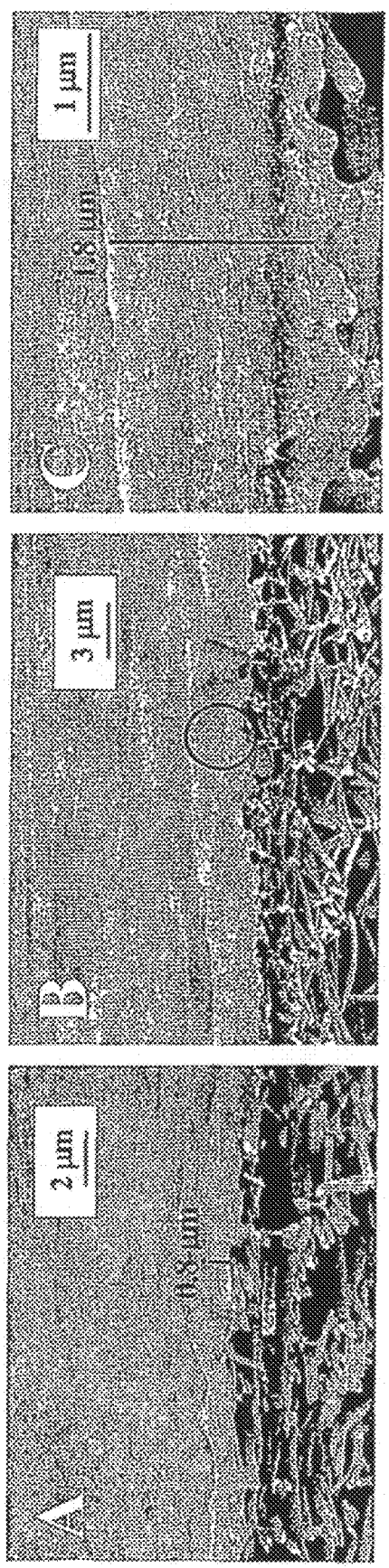
FIG. 12 includes typical SEM cross-sectional images of composite membranes.

The morphology of the resulting composite membranes was investigated by SEM. Typical SEM cross-sectional images are set forth in FIG. 12, which revealed that the electrospun PVA layer was covered with a hydrophilic coating layer. In FIGS. 12A and 12B, the fibrous structure of the electrospun PVA layer can be clearly seen. The surface of the hydrophilic coating layer was smooth and nonporous based on the instrumental resolution of SEM (about 1-3 nm). As can be seen in FIG. 12C, the nanotubes were well dispersed in the thin polymer nanocomposite coating layer, where no agglomerates or clumps were observed.

Example 12

Cross-flow measurements were carried out using oil/water emulsions (soybean oil: 1350 ppm, nonionic surfactant (Dow Corning 193 fluid): 150 ppm in water) at a feed pressure of 100 psi and a temperature of 30-35° C. for 24 hours. The effective filtration area was 66.5 cm². The filtered water quality was evaluated by UV-VIS spectroscopy (absorbance at 230 nm). A calibration curve of waste oily water in the range of 0 to 100 ppm was used to determine the organic concentration of water. Permeation flux can be calculated by the following equation:

$$J = Q/A\Delta t$$

where J is the permeation flux (L/m²·h); Q is the permeation volume (L) of the testing solution; A is the effective area of the tested substrate (m²), and $\Delta t$ is the sampling time (h). The total organic concentration (TOC) rejection (R %) in the filtration of oil/water emulsion is given by $$R = (1 - TOC \text{ in permeate}/TOC \text{ in feed}) \times 100$$

Figure 13:
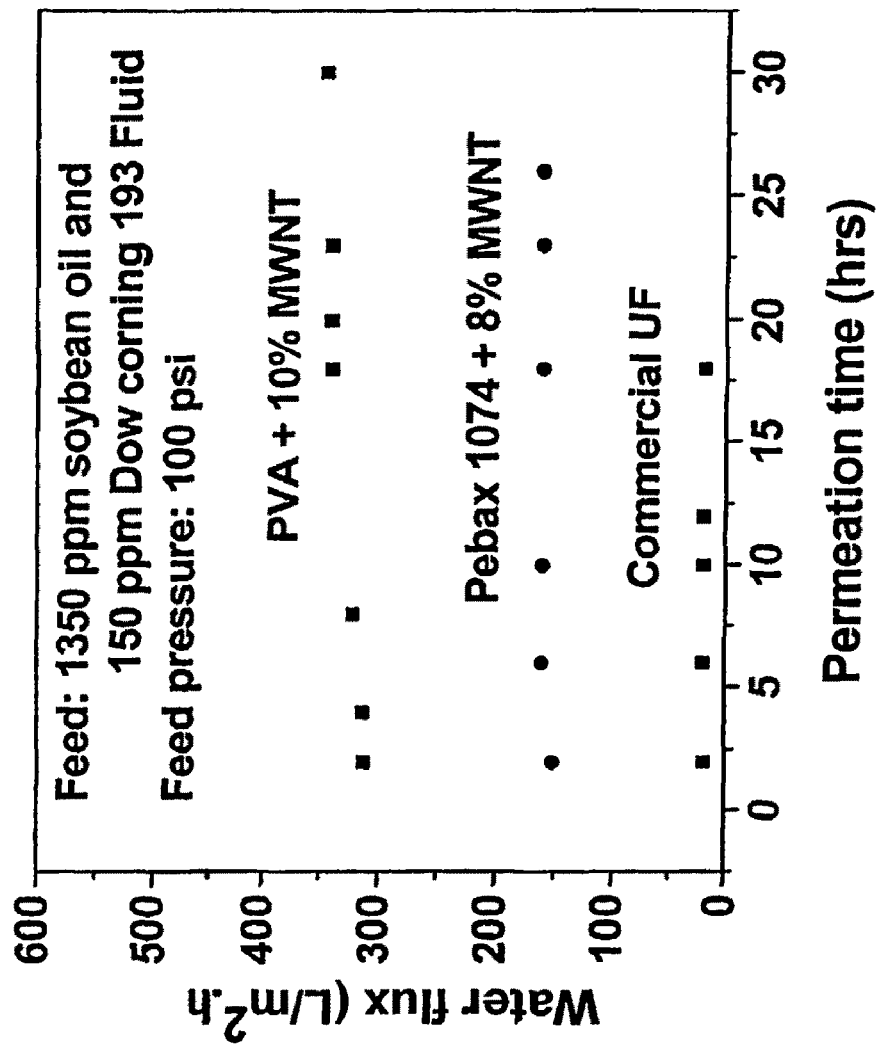
FIG. 13 is a graph depicting the performance of water flux of hydrophilic composite membranes in oil/water emulsion.

Cross-flow measurements were performed using oil/water emulsion (soybean oil: 1350 ppm, nonionic surfactant (Dow Corning 193 fluid): 150 ppm in water) at 100 psi feed pressure and 30-35° C. to test the ultrafiltration performance of hydrophilic nanofibrous composite membranes. FIG. 13 shows the typical ultrafiltration performance of two composite membranes (PVA nanofibrous substrate with PVA/MWNT (90/10 w/w) nanocomposite coating and with PEBAX®/MWNT (92/8 w/w) nanocomposite coating), where steady fluxes were observed within the experimental time frame without detectable fouling. For comparison, the filtration performance of a commercial UF membrane (from Pall Corporation) was also included in FIG. 13. The flux rate of the membrane with PVA/MWNT (90/10 w/w) nanocomposite coating was much higher than that of the commercial UF membrane (330 vs. 18 L/m²·). This value was also about two times higher than that with PEBAX®/MWNT (92/8 w/w) nanocomposite coating. Compared with the reported PEBAX® copolymer composite membranes (~50 L/m²·h), electrospun PVA nanocomposite membranes exhibited a substantially higher flux rate.

Table 3 below lists results of the flux rate and total organic rejection for a series of membranes based on crosslinked electrospun PVA nanofibrous substrates coated with a pure PEBAX® or PEBAX® 1074/MWNT nanocomposite layer.

TABLE 3

| PEBAX ®/MWNT | Flux (L/m² · h) | Rejection (%) |
|---|---|---|
| Pure PEBAX ® | 58 | 99.9 |
| 6 wt % MWNT/PEBAX ® | 105 | 99.8 |
| 8 wt % MWNT/PEBAX ® | 161 | 99.8 |
| 12 wt % MWNT/PEBAX ® | 310 | 98.3 |

As can be seen in Table 3, the value of the flux rate increased with increasing MWNT content. The tested composite membranes showed excellent rejection of oil/surfactant (>99.7%) even when the MWNT content was as high as 8% (the values of rejection did not vary significantly). When the MWNT content was 12%, the water flux was found to increase significantly while the rejection decreased to 98.3%. These results demonstrate that high water flux with low organic rejection Was found at a high feed pressure of about 100 psi.

Table 4 below lists results of the flux rate and the total organic rejection for a series of membranes based on crosslinked PVA nanofibrous substrates coated with a pure lightly crosslinked electrospun PVA hydrogel or PVA hydrogel/MWNT nanocomposite layer.

TABLE 4

| PVA hydrogel/MWNT | Flux (L/m$^2$·h) | Rejection (%) |
|---|---|---|
| Pure PVA | 67 | 99.8 |
| 5 wt % MWNT/PVA | 143 | 99.8 |
| 10 wt % MWNT/PVA | 330 | 99.8 |
| 15 wt % MWNT/PVA | 445 | 98.8 |
| *Commercial UF filter | 18 | 99.9 |

*From Pall Corporation

As can be seen from Tables 3 and 4 above, the PEBAX®/MWNT coating provided similar results as membranes with the PVA hydrogel/MWNT coating, i.e., the incorporation of the MWNT in the coating layer increased the water flux. When the content of MWNT was the same and the rejection rate was similar, the membrane with the PVA/MWNT coating exhibited a higher flux rate than that with PEBAX®/MWNT coating, even though the PVA coating layer was thicker than the PEBAX® coating layer. For example, a very high water flux rate (330 L/m$^2$·h, i.e., over an order of magnitude higher than that of a commercial UF filter) accompanied by high rejection rate (99.8%) was achieved by the membrane with PVA hydrogel/MWNT coating having 10 wt % MWNT.

Swelling tests were carried out for two base-coating materials. Free-standing films of pure PEBAX® 1074 and of pure lightly crosslinked PVA were immersed in distilled water for 48 hours. The water uptake per gram of the PEBAX® 1074 film was 0.51 g, while the water uptake per gram of the PVA hydrogel film was 1.63 g. The swelling results suggested that the hydrophilicity of the PEBAX® 1074 coating was less than that of the PVA coating layer, and thus water could be more accessible in the PVA hydrogel.

The rejection data for PVA hydrogel/MWNT samples were similar to those for PEBAX®/MWNT samples (Tables 3 and 4). The water permeability for both kinds of composite membranes were enhanced by the incorporation of MWNTs into the nonporous coating layer and the rejection values for both kinds of composite membranes were essentially unaffected by the presence of up to 8 wt % MWNT in PEBAX® and 10 wt % MWNT in the PVA matrix.

Figure 14:
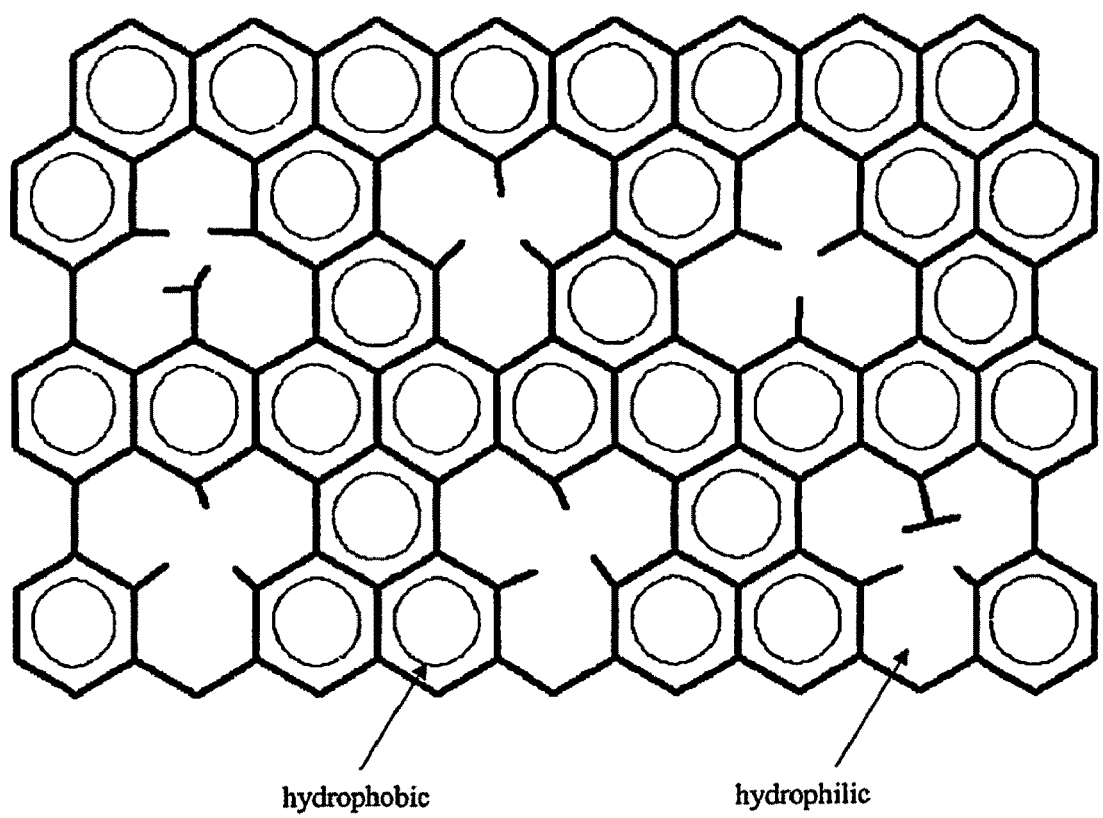
FIG. 14 is a schematic diagram of the surface structure of oxidized MWNT (the oxidized region is shaded, which is distributed randomly on the surface of MWNT)

The surface of MWNT had a graphite layered structure with a very low surface tension, when compared with that of the hydrophilic coating materials (PEBAX® 1074 and PVA). In order to improve the compatibility between MWNT and these hydrophilic polymers, the oxidation treatment was performed on MWNTs to generate carboxylic acid (—COOH), carbonyl (—C=O) and hydroxy (—OH) functional groups on the surface, as shown in FIG. 14. The density of the acidic groups was relatively high (up to 1.8 mmol/g). Thus, the surface of MWNT could possess bicontinuous nanophase domains: hydrophobic aromatic regions and hydrophilic acidic regions.

When oxidized MWNTs were incorporated into the polymer matrix, the amphiphilic MWNT surface disrupted the polymer chain packing in the interface and could introduce nanoscaled cavities to affect the transport property of the coating layer. For instance, these functional groups could interact with PVA chains through chemical bonding (via the crosslinking agent glutaraldehyde in the solution) or hydrogen bonding between the acidic group on the surface of oxidized MWNTs and the hydroxyl groups on the PVA chains. The cavities formed between hydrophilic PVA chains and hydrophobic aromatic regions on the surface of oxidized MWNT could provide additional pathways for water permeation. Therefore, although the composite coating layers were macroscopically nonporous, as confirmed by SEM, microscopically effective nanochannels were produced through the incorporation of surface-oxidized MWNTs into the polymer matrix. As a result, the values of water permeability in composite membranes increased systematically with increasing MWNT concentration. Thus, the incorporation of MWNT offered two unique advantages: (1) an improvement in the mechanical strength of the coating layer, and (2) an increase in the water permeability of the coating layer.

As demonstrated by the above, novel high flux composite membranes for ultrafiltration were developed based on a crosslinked electrospun PVA layer coated with a nonporous hydrophilic polymer/MWNT nanocomposite layer. The electrospun nanofibrous substrates provided good tensile strength and an extremely lightweight and interconnected porous structure with a large specific surface area, making them excellent candidates as ultrafiltration supporting scaffolds.

Ultrafiltration results using oil/water emulsions suggested that the incorporation of surface-oxidized MWNT could modify the packing of hydrophilic chains in the interface, thereby producing effective nanochannels for water permeation. The values of water permeability for composite membranes with PEBAX® 1074 or PVA hydrogel nanocomposite coating increased substantially with increasing MWNT content, while the filtration rejection efficiency for both membranes was essentially unaffected by the presence of MWNT (up to 8 wt % MWNT in PEBAX® and 10 wt % MWNT in PVA). The PVA hydrogel/MWNT coating layer displayed more accessible free volume for water transport than the PEBAX® 1074/MWNT coating layer. The composite membrane with PVA hydrogel/MWNT (10 wt %) coating exhibited excellent organic solute rejection (99.8%) and high water flux (up to 330 L/m$^2$·h, i.e. more than an order of magnitude higher than that of a typical commercial UF filter) with no detectable fouling over a 24 hour operating period.

Example 13

Preparation of PVA Nanofibrous Substrate. PVA with Various Molecular Weights and degrees of hydrolysis were utilized as set forth in Table 5. Table 5 notes the weight average molecular weight ($M_w$) and degree of hydrolysis (%) for the PVA samples (the samples were labeled as HMw, MMw and LMw to indicate high, medium and low molecular weights).

TABLE 5

| Sample # | Mw (g/mol) | Hydrolysis degree (%) |
|---|---|---|
| 1 | 85,000-124,000 (HMw) | 88-89 |
| 2 | 85,000-124,000 (HMw) | 96 |
| 3 | 85,000-124,000 (HMw) | 98-99 |
| 4 | 78,000 (MMw) | 98 |
| 5 | 13,000-23,000 (LMw) | 98 |

These samples were purchased from Aldrich Chemical (Milwaukee, Wis.), except for sample 4 with a weight average molecular weight ($M_w$) of 78,000 g/mol (98% hydrolyzed) which was purchased from Polysciences Inc. (Warrington, Pa.). Triton X-100, glutaraldehyde (GA) (50% aqueous solution) and hydrochloric acid (36.5% aqueous solution) were also purchased from Aldrich. PEBAX® 1074 was supplied by Atofina. The PEO content in PEBAX® 1074 was 55 wt %, giving a relatively high hydrophilicity. All of these materials were used as received without further purification.

The PVA was subjected to the electrospinning procedures described above in Example 7. Aqueous PVA solutions were prepared by dissolving PVA powder samples in distilled water at 40-95° C., depending on the degree of hydrolysis, with constant stirring for at least 6 hours. When the solution was cooled to room temperature, Triton X-100 was added into the PVA solution at a concentration of 0.6 w/v %. The mixture was stirred further for 15 min before electrospinning. Triton X-100 surfactant was used to lower the surface tension of the polymer solution and to allow the electrospinning of PVA to be carried out at a higher feeding rate (~2.4 ml/h).

Typical parameters for the electrospinning of PVA were as follows. The PVA solution feeding rate was 2.4 ml/h, the applied electric field was 28 kV, and the distance between the spinneret and collector was 10 cm.

Example 14

Morphological Characterization. The morphology of electrospun PVA nanofibrous membrane was examined by scanning electron microscopy (SEM, LEO 1550, LEO, USA) after gold coating as described above in Example 11. SEM cross-section images of composite membranes were obtained by fracturing of samples in liquid nitrogen. The resolution of SEM instrument was about 2-5 nm with an operating voltage range of 1-30 kV.

Figure 15:
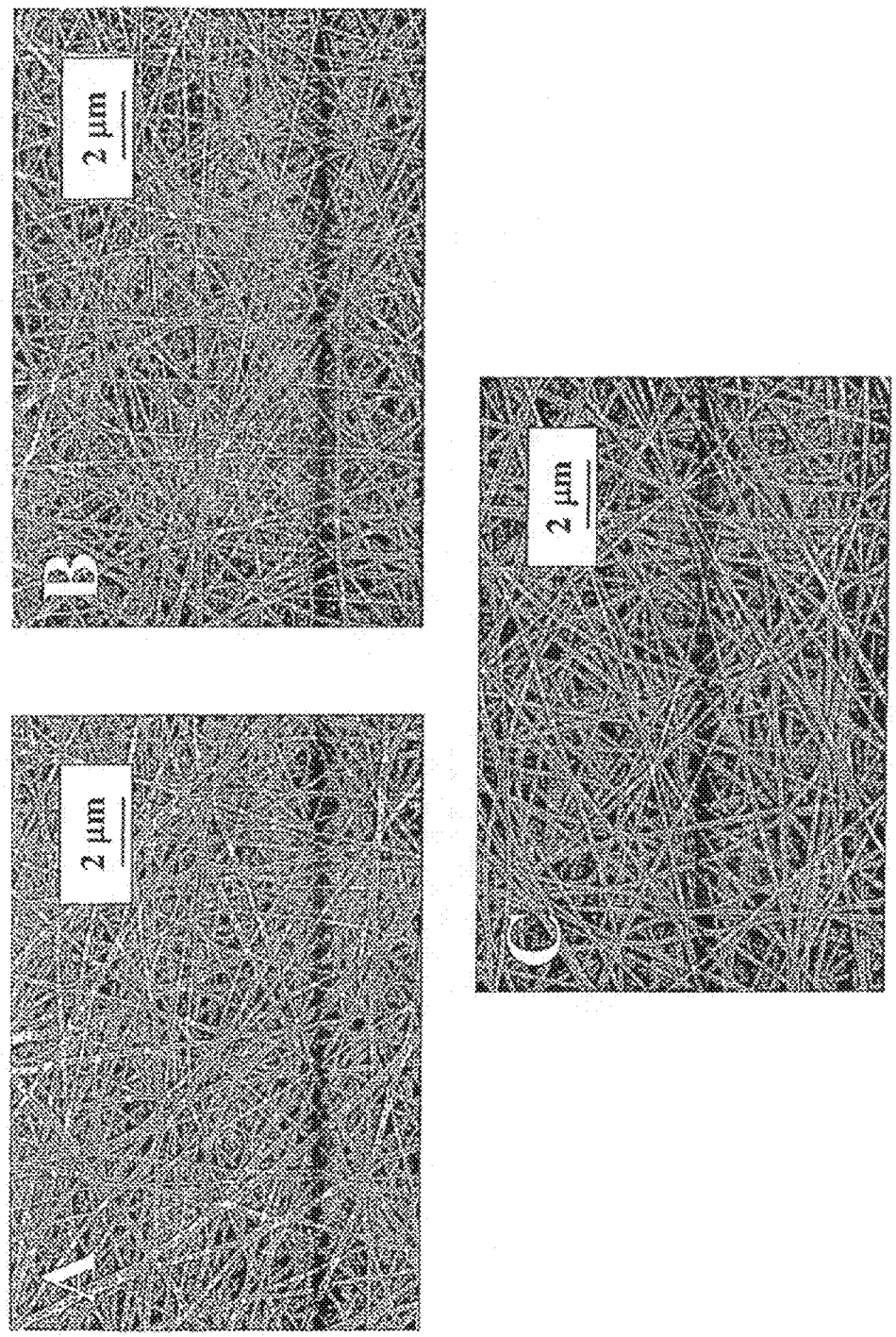
FIG. 15 are SEM images of electrospun PVA membranes with various molecular weight but similar degrees of hydrolysis.

FIG. 15 shows typical SEM images of electrospun PVA membranes prepared from three kinds of PVA with a similar degree hydrolysis (i.e. ca. 98%) and different molecular weights under an applied voltage of 28 kV and the spinneret-to-collector distance of 10 cm. FIG. 15A was 98% hydrolyzed, $M_w$ 13,000-23,000 g/mol (electrospun from 24 wt % solution); FIG. 15B was 98% hydrolyzed, $M_w$ 78,000 g/mol (from 11 wt % solution); and FIG. 15C was 98-99% hydrolyzed, $M_w$ 85,000-124,000 g/mol (from 9 wt % solution).

Figure 16:
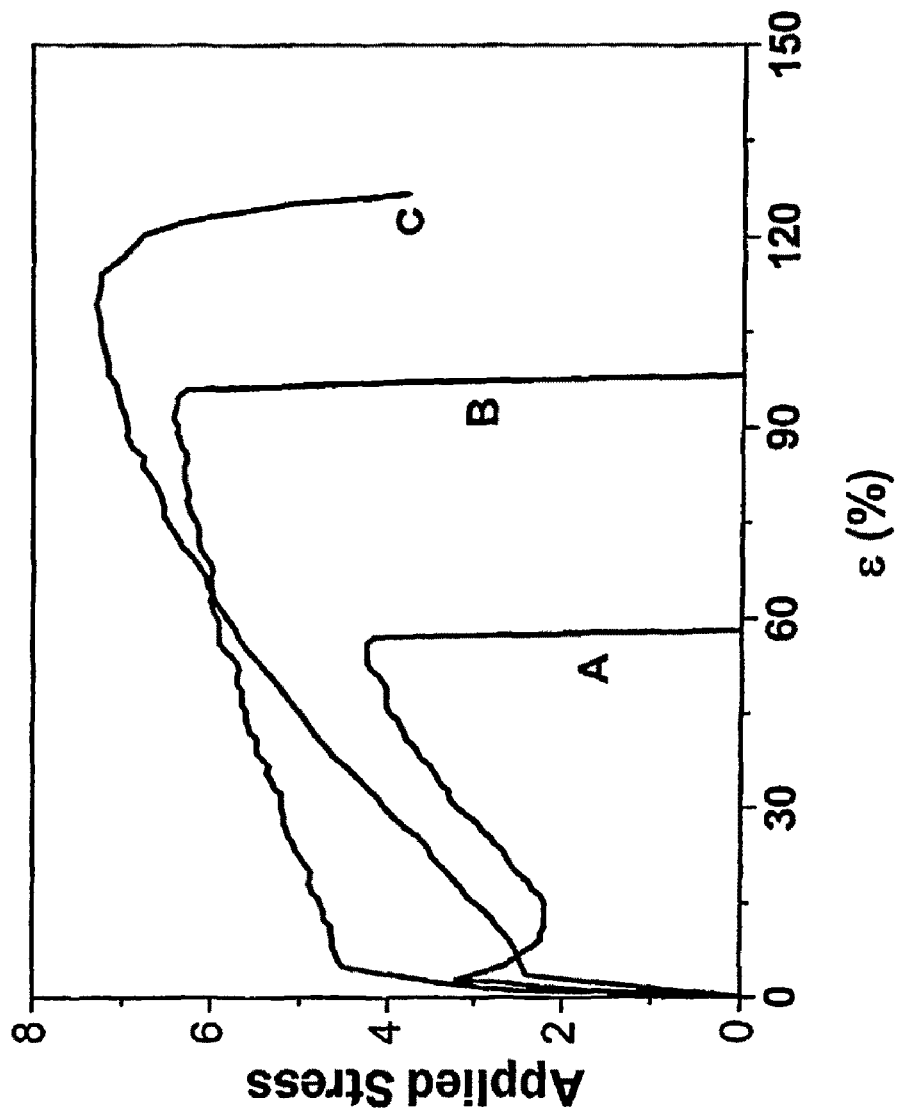
FIG. 16 shows stress-elongation curves of electrospun PVA nanofibrous scaffold before crosslinking with samples of different molecular weights but similar degrees of hydrolysis.

As seen in FIG. 15, the optimal condition for electrospinning of PVA was achieved by using different PVA concentrations, depending on the molecular weight of the sample (the higher the molecular weight, the lower the concentration). All three scaffolds exhibited a similar porosity and fiber diameter (between 100-300 nm). The relations between the applied stress and elongation ratio (c, where strain=1+∈) of electrospun PVA scaffolds prior to the crosslinking reaction are shown in FIG. 16. FIG. 16A was 98% hydrolyzed, LMw; FIG. 16B was 98% hydrolyzed, MMw; FIG. 16C was 98-99% hydrolyzed, HMw.

The corresponding values of tensile modulus, tensile strength and elongation to break ratio of these electrospun PVA scaffolds are set forth in Table 6 below.

TABLE 6

| Sample | Tensile Modulus (MPa) | Tensile Strength (MPa) | Elongation at break (%) |
|---|---|---|---|
| LMw (98%) | 110 | 4.3 | 57 |
| MMw (98%) | 93 | 6.4 | 96 |
| HMw (98-99%) | 66 | 7.3 | 120 |
| HMw (96%) | 40 | 7.6 | 130 |
| HMw (88%) | 6.4 | 4.8 | 174 |
| *HMw (98-99%) | 57 | 6.8 | 45 |
| *HMw (96%) | 48 | 13.5 | 67 |

*Crosslinked sample

It was found that both elongation at break and tensile strength were increased, while the tensile modulus was decreased with increasing molecular weight. The electrospun scaffold produced from PVA with the highest molecular weight ($M_w$ 85,000-124,000 g/mol) exhibited the highest stress (7.3 MPa) and the largest elongation at break value (110%), when compared with scaffolds produced from PVA of medium and low molecular weights.

Figure 17:
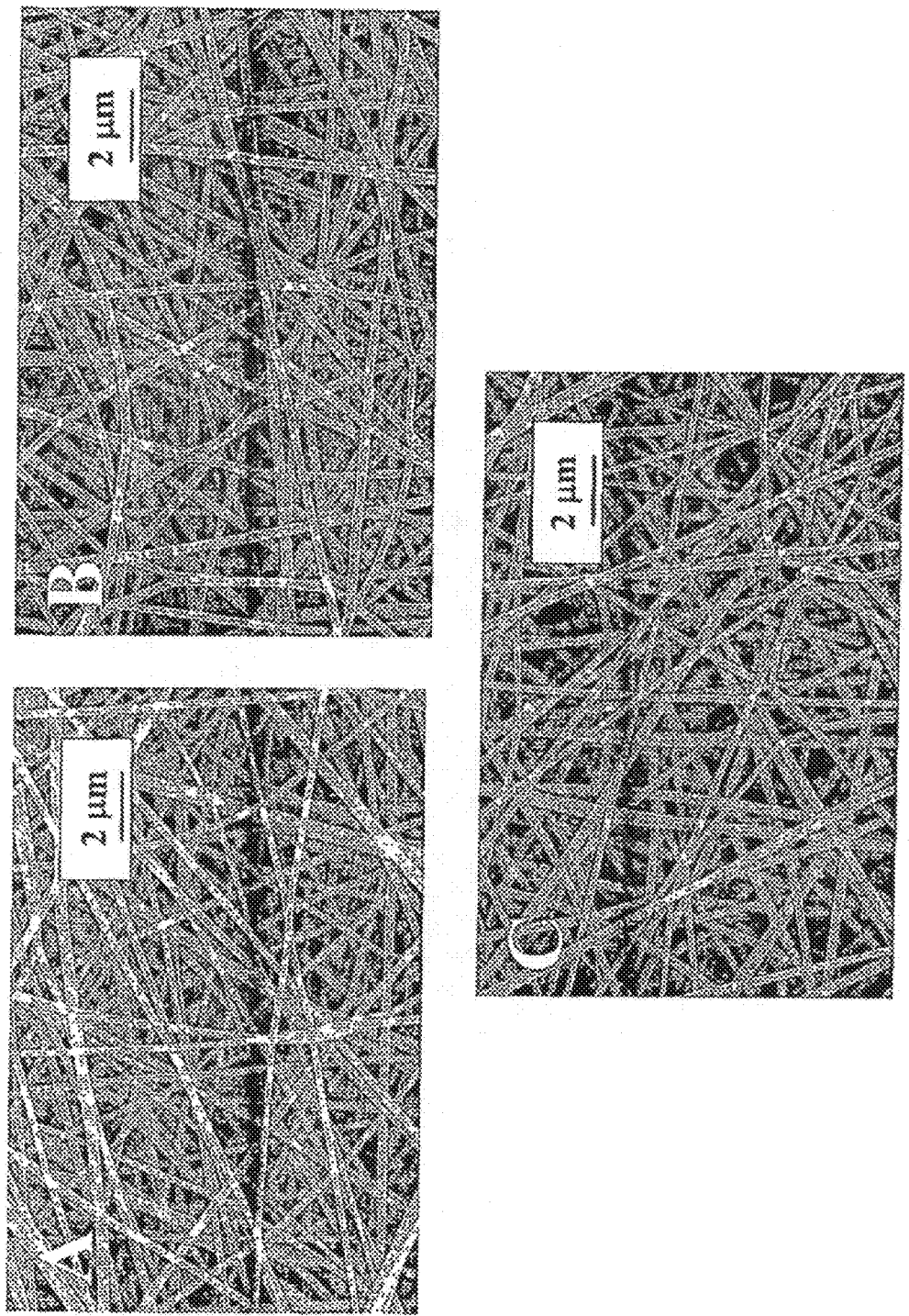
FIG. 17 shows typical SEM images of electrospun PVA scaffold based on high molecular weight sample (85,000-124,000 g/mol) with different degrees of hydrolysis (solution concentration for electrospinning was 10 wt %)

FIG. 17 shows typical SEM images of electrospun PVA scaffolds prepared by using the high molecular weight PVA samples (HMw, 85,000-124,000 g/mol) with different degrees of hydrolysis (solution concentration for electrospinning was 10 wt %) under the same electrospinning conditions. FIG. 17A was 88-89% hydrolyzed; FIG. 17B was 96% hydrolyzed; FIG. 17C was 98-99% hydrolyzed.

Figure 18:
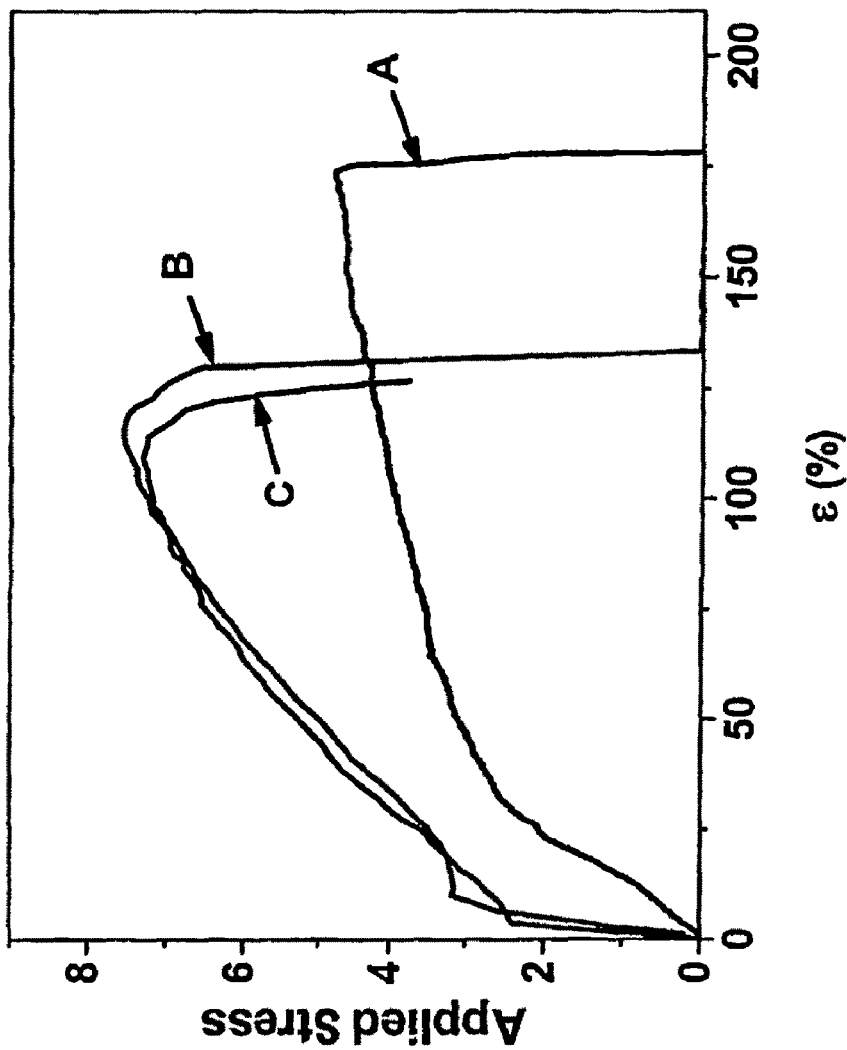
FIG. 18 shows stress-elongation curves of electrospun PVA scaffolds based on high molecular weight sample (85,000-124,000 g/mol) with different degrees of hydrolysis.

The fibrous structure did not change significantly with the increasing degree of hydrolysis. The average diameter of the fibers in all three scaffolds was in the range of 225 to 240 nm. The applied stress and elongation ratio curves of these samples are shown in FIG. 18, with the corresponding values of tensile strength, tensile modulus and elongation to break ratio being also illustrated in Table 6. FIG. 18A was the sample that was 88-89% hydrolyzed; FIG. 18B was the sample that was 96% hydrolyzed; and FIG. 18C was the sample that was 98-99% hydrolyzed.

The electrospun scaffold prepared from the low degree of hydrolyzed (88-89%) PVA possessed the highest elongation at break ratio, the lowest tensile strength and the lowest tensile modulus (only 6.4 MPa); whereas electrospun scaffolds made from 96% and 98-99% hydrolyzed PVA exhibited much greater values of tensile modulus (40 and 66 MPa, respectively) and tensile strength, but lower values of elongation ratio at break. The above results indicated that in electrospun PVA scaffolds (in the non-crosslinked form and with similar morphology and fiber diameter), samples with high degrees of hydrolysis and high molecular weight exhibited the best overall mechanical properties (i.e. high tensile modulus, tensile strength, as well as elongation at break ratio), making them good candidates for ultrafiltration applications.

Example 15

Crosslinking of Electrospun PVA Scaffolds. Crosslinking treatments of electrospun PVA nanofibrous scaffolds prepared in Example 13 were conducted as set forth above in Example 8. Electrospun PVA scaffolds were crosslinked by immersion in acetone solution with 30 mM glutaraldehyde and 0.01 N HCl for 24 hours. The crosslinked PVA membrane was washed in water several times and then dried in a hood before use. The density of the electrospun PVA membrane was determined from an average of five samples using the mass divided by the volume of the sample. The porosity of each membrane was calculated as described above in Example 8, i.e., $$\text{Porosity} = (1-\rho/\rho_0) \times 100$$

where ρ is the density of electrospun membrane and $ρ_0$ is the density of bulk polymer.

Figure 19:
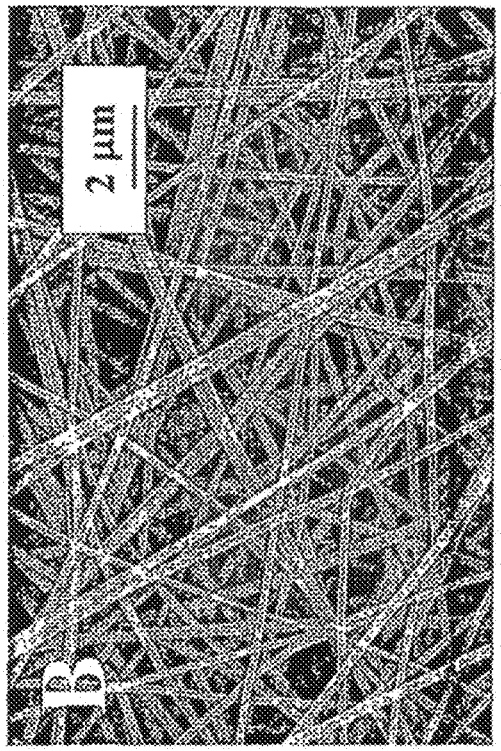
FIG. 19 shows typical SEM images of the crosslinked electrospun PVA scaffolds.
Figure 19:
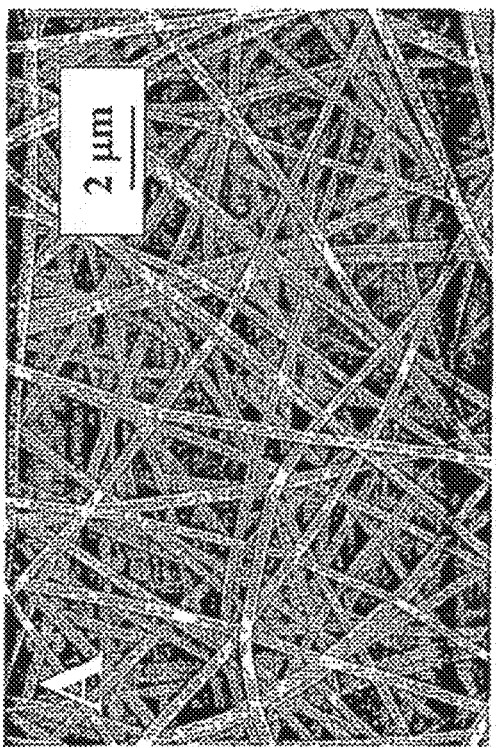

The pores in such a scaffold were fully interconnected and formed a three dimensional network with an average pore size in the submicron size range of about 0.1 to about 3 μm. The fiber diameter of this electrospun scaffold was in the range of 150-300 nm (as shown in FIGS. 17 and 19), and the average porosity of the scaffold was about 84% and 82% before and after crosslinking, respectively.

The electrospun PVA based on 98% hydrolyzed MMw sample was crosslinked as described above in Example 8. Similar procedures were utilized to treat the two electrospun PVA scaffolds with best mechanical performance (i.e., HMw samples with 96-99% hydrolysis). FIG. 19 shows representative SEM images of crosslinked electrospun PVA scaffolds based on 96% hydrolyzed HMw (FIG. 19A) and 98-99% hydrolyzed HMw (FIG. 19B).

As observed, there was no obvious change in the fiber diameter (~230 nm) in comparison with SEM images in samples before crosslinking (FIG. 16). However, volume shrinkage (less than 5%) in the PVA scaffold induced by crosslinking was also noted. Nevertheless, the surface of the crosslinked scaffold remained relatively flat and smooth, which is a desirable characteristic to support a top layer of thin film coating.

Example 16

Preparation of Hydrophilic Nanofibrous Composite Membrane for Ultrafiltration. Aqueous 2.0 wt % PVA (96% hydrolyzed, $M_w$ 85,000~124,000) solution (pH ~2, adjusted by hydrochloric acid) was utilized as a hydrogel coating on top of the electrospun scaffold of Example 15 above. The crosslinked electrospun PVA scaffold of Example 15 was first placed on a commercial poly(ethylene terephathalate) nonwoven substrate (PET microfilter FO2413 from Freudenburg Nonwovens; the average fiber diameter in this substrate was about 10 μm). About 30 mM of glutaraldehyde was added to the 2.0 wt % PVA solution prior to coating. The surface of the PVA nanofibrous support was rinsed with water and then coated with PVA coating solution. The composite membrane was sealed (to minimize the solvent evaporation) for 6 hours in order to allow for the crosslinking of the top layer. The resulting membrane was then dried at ambient temperature until constant mass was achieved.

The crosslinking degree of the PVA hydrogel coating layer was varied by changing the molar ratio of glutaraldehyde and PVA repeat unit. For comparison, a nanofibrous composite membrane based on the electrospun PVA support of Example 13 coated with the hydrophilic copolymer PEBAX® 1074 was also prepared using the following procedures. 1.0 wt % PEBAX® 1074 solution in 1-butanol was prepared by refluxing PEBAX® in butanol for 24 hours. The coating process of PEBAX® was similar to that of PVA hydrogel, except that no crosslinking reaction was necessary.

Figure 21:
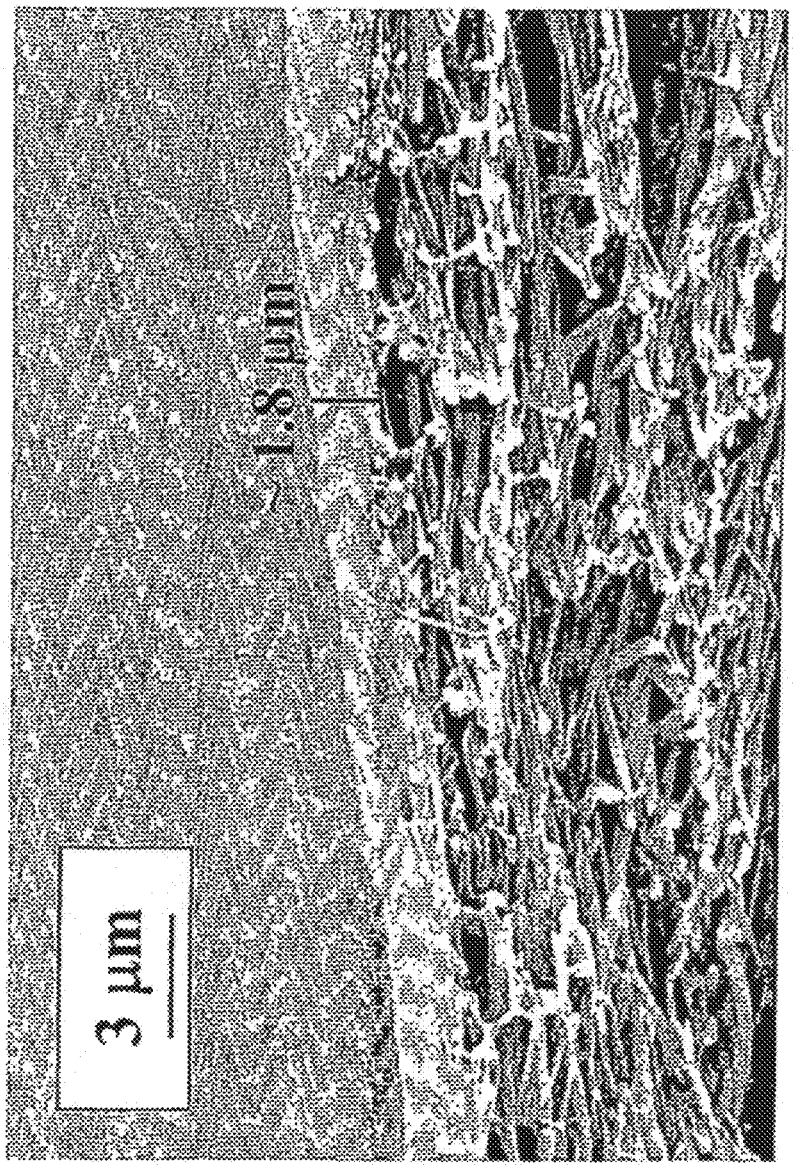
FIG. 21 is a typical SEM cross-sectional image of PVA nanofibrous composite membrane.

A typical SEM cross-sectional image of the composite membrane is shown in FIG. 21, revealing the morphology of a nanofibrous composite membrane, comprising of a top layer of PVA hydrogel with a thickness of ~1.8 μm coated on a microporous crosslinked electrospun PVA support. The surface of the top PVA hydrogel coating layer was smooth and nonporous based on the resolution of SEM. The layer of PVA hydrogel consisted of a network of macromolecular chains connected through crosslinking points, defining an effective mesh size allowing the water to permeate. The increase in the number of crosslinking point would decrease the mesh size, leading to a decrease in the permeate flux.

Example 17

Mechanical Property Evaluation. The mechanical properties of electrospun PVA nanofibrous supports of Examples 13 and 15 and composite membranes of Example 16 without coating were determined using an Instron (model 4442) tensile machine at ambient temperature. The sample gauge length was 10 mm and the crosshead speed was 2 mm/min. Typical specimen sizes for the mechanical evaluation were 20 mm (length)×5 mm (width)×100 μm (thickness).

For the optimization of mechanical properties of the electrospun scaffold, PVA with different degrees of hydrolysis (from 88-89% to 98-99%) and molecular weights (from 13,000-23,000 to 85,000-124,000 g/mol) were tested, where the crosslinking reaction was carried out with glutaraldehyde (GA) in acetone.

Figure 20:
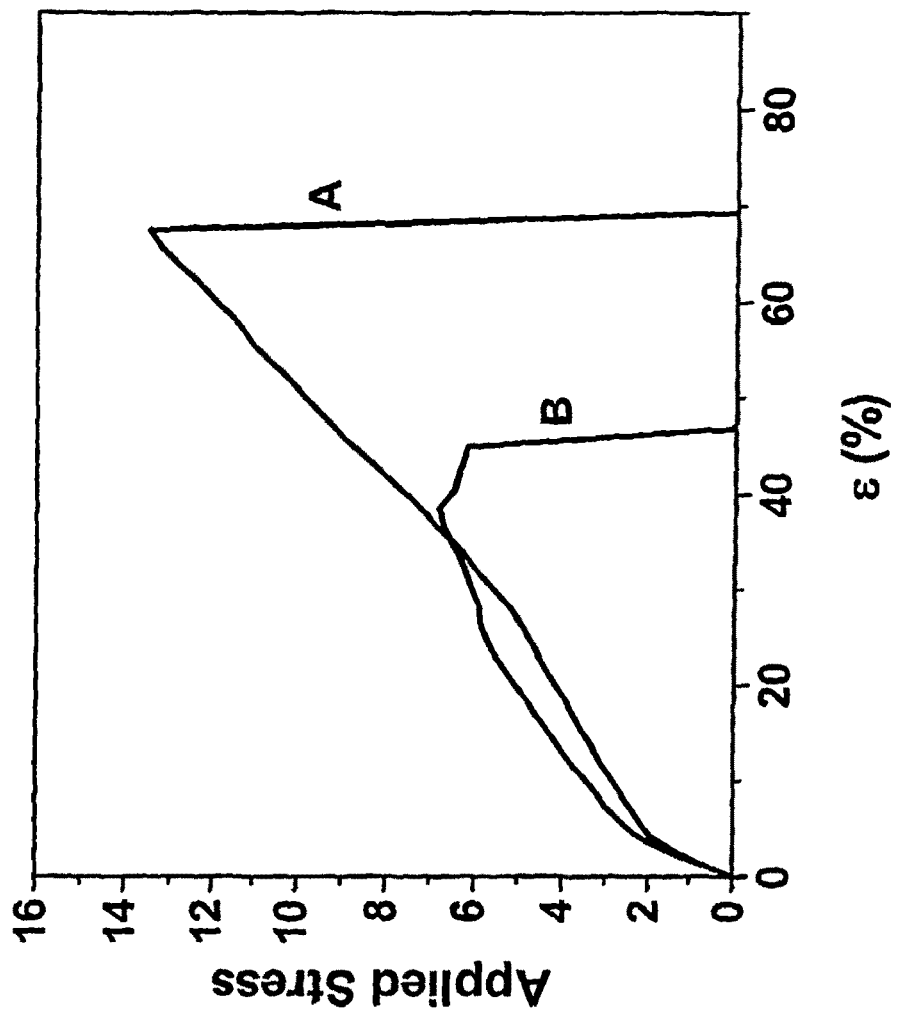
FIG. 20 shows stress-elongation curves of crosslinked electrospun PVA scaffolds.

FIG. 20 shows the corresponding stress and elongation curves of crosslinked PVA electrospun scaffolds. FIG. 20A was the sample that was 96% hydrolyzed HMw; FIG. 20B was the sample that was 98-99% hydrolyzed HMw.

The mechanical properties are also summarized above in Table 6. It was seen that the tensile moduli for crosslinked 98-99% and 96% hydrolyzed samples were very close. In the 98-99% hydrolyzed sample, the tensile strength was 6.8 MPa and the elongation at break decreased to 45% (lower than uncrosslinked sample); while in the 96% hydrolyzed sample, the tensile strength was 13.5 MPa and the elongation at break was 67%.

The crosslinked electrospun scaffold using 96% hydrolyzed PVA and high molecular weight (85,000-124,000 g/mol) exhibited the best overall mechanical performance with high tensile strength and elongation. The crosslinking reaction only resulted in a minor shrinkage in volume (<5%) in the electrospun scaffold, whereby the resulting porosity was relatively high (>80%). The PVA coating layer on the electrospun scaffold was crosslinked using GA at varying concentrations. Although the PVA hydrogel coating layer was macroscopically non-porous, it acted microscopically as a mesh of hydrophilic chains connected by crosslinking points. The mesh size could be controlled by the degree of crosslinking in the hydrogel and the best permeation rate and filtration efficiency was achieved by using the GA/PVA repeat unit ratio of 0.06 to crosslink the top PVA layer.

The ultrafiltration test indicated that the flux rate of PVA nanofibrous composite membranes was at least several times better than those of existing conventional ultrafiltration membranes, where its performance can be further optimized by reducing the top layer thickness or changing the layer composition.

Based on the mechanical data provided in Table 6 above, it can be seen that the electrospun scaffold based on lower molecular weight material exhibited a lower value of elongation at break, while the scaffold based on high molecular weight material had a higher value of elongation at break. A decrease in the degree of hydrolysis significantly decreased the tensile modulus, while the crosslinking treatment significantly decreased the elongation at break ratio. Overall, the electrospun scaffold of high molecular weight (85,000-124,000 g/mol) and 96% hydrolyzed PVA exhibited relatively better balanced mechanical properties (i.e., high tensile modulus, strength and elongation) both before and after crosslinking.

Example 18

Ultrafiltration Evaluation. For ultrafiltration evaluation, a composite membrane of Example 17 using the nanofibrous scaffold of Example 15 was fabricated from 96% hydrolyzed PVA (HMw) and crosslinked with 30 mM glutaraldehyde. Cross-flow measurements were carried out to characterize the ultrafiltration performance of the nanofibrous composite membrane. Cross-flow measurements were carried out by separating an oil/water emulsion containing soybean oil (1350 ppm), nonionic surfactant (Dow Corning 193 fluid, 150 ppm) and water. The chosen filtration conditions were as follows: the feed pressure (P) was 100 psi, temperature was 30-35° C. and filtration duration was 24 hours. The effective filtration area was 66.5 cm². The quality of filtered water was evaluated by UV-VIS spectroscopy (based on the absorbance at 230 nm). A calibration curve of waste oily water in the range of 0 to 100 ppm was used to determine the organic concentration of filtered water. The permeation flux was calculated as described above in Example 12, i.e., $$J=Q/A\Delta t$$

where J is the permeation flux (L/m²·h), Q is the permeation volume of the testing solution; A is the effective area of the tested membrane (m²), and Δt is the sampling time (h).

The total organic concentration (TOC) rejection (R %) in the filtration of oil/water emulsion was calculated as described above in Example 12, that is, $$R\%=(1-\text{TOC in permeate}/\text{TOC in feed})\times 100$$

Figure 22:
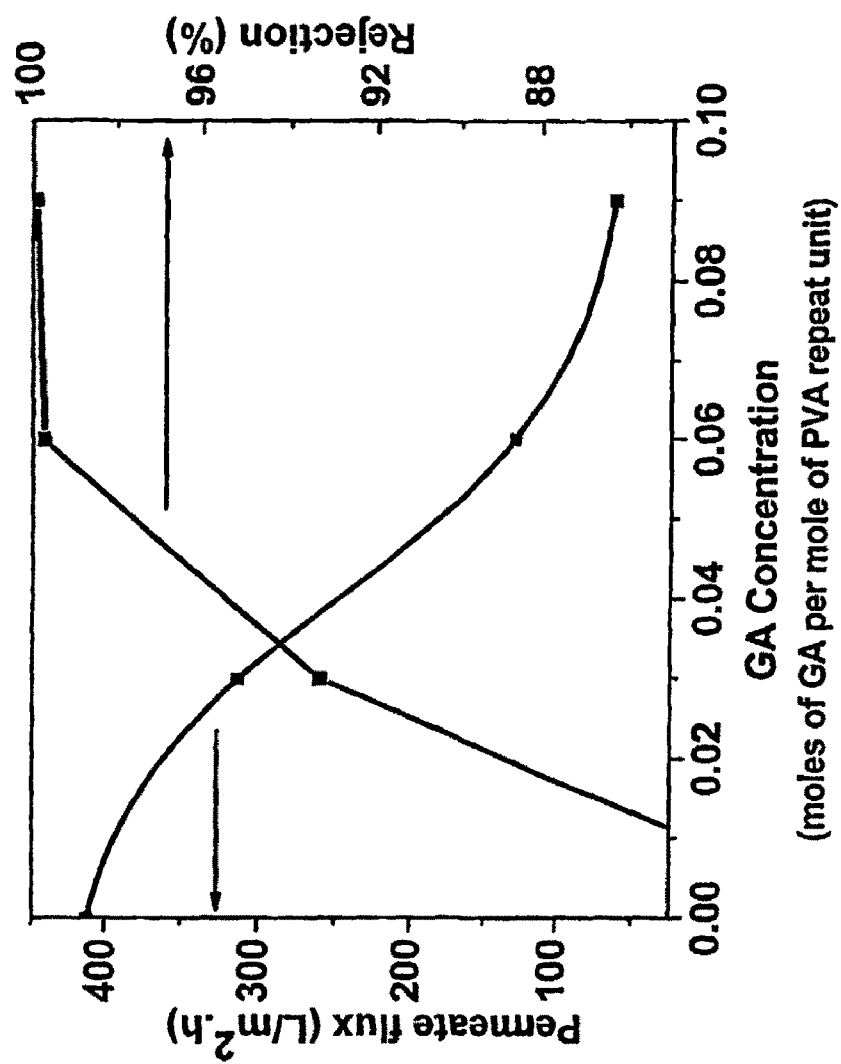
FIG. 22 is a graph depicting the relationship of permeate flux and solute rejection of the nanofibrous composite membranes with the degree of crosslinking in the PVA hydrogel coating for separation of oil/water emulsion (feed pressure: 100 psi; temperature: 30-35° C.)

FIG. 22 shows the relation of permeate flux and solute rejection in the composite membrane with the degree crosslinking in the PVA top coating layer. The flux rate decreased with increasing degree of crosslinking in the top layer. For the sample with PVA coating without crosslinking, the hydrophilic PVA coating layer swelled and the membrane behaved as an open gel. Large-size solute could pass through the membrane, resulting in a poor rejection of the solute. When the top layer was crosslinked, its swelling behavior (in water) and the corresponding mesh size (i.e., the gel structure) were dependent on the degree of crosslinking. Thus, the increase in the degree of crosslinking in the top layer decreased the corresponding mesh size, resulting in increased solute rejection ratio and decreased permeate flux, as seen in FIG. 22.

Figure 23:
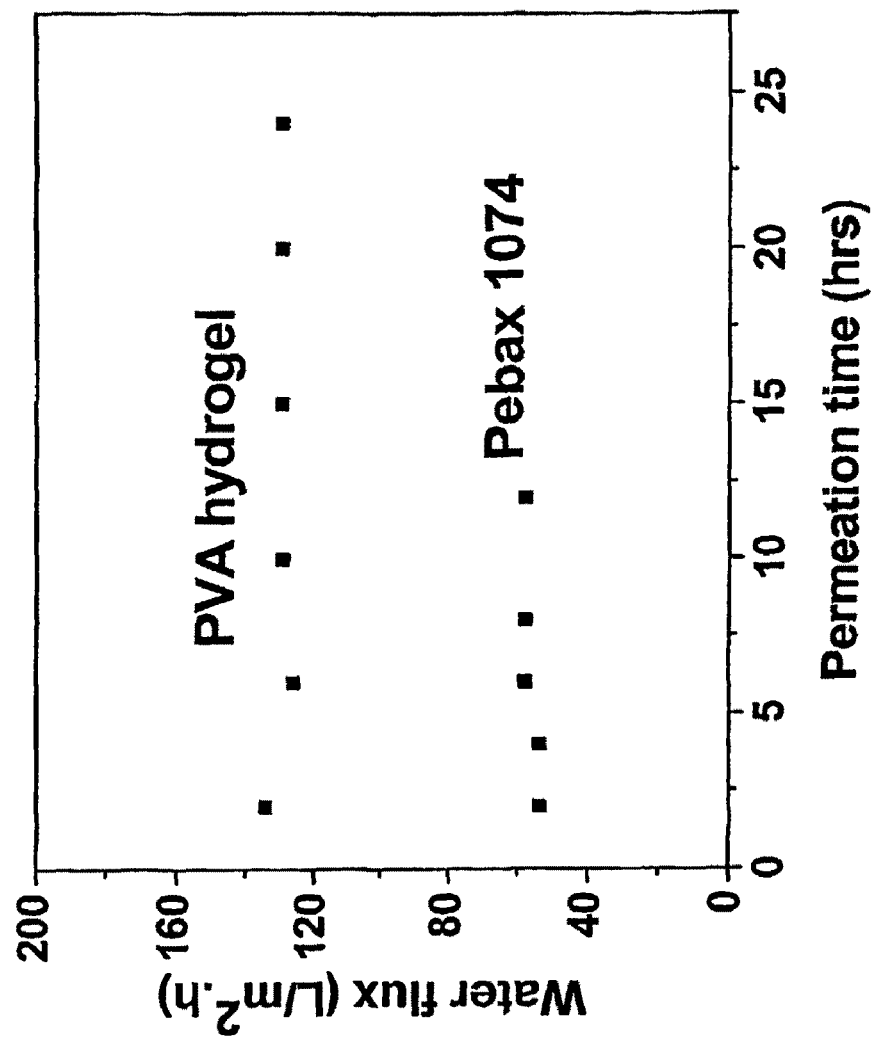
FIG. 23 is a graph depicting the flux rate of hydrophilic nanofibrous composite membranes using two different coating layers (PVA hydrogel; crosslinked with the GA/PVA repeat unit ratio of 0.06, and PEBAX) for separation of oil/water emulsion. Thickness of the PVA coating layer was 1.8 μm, and thickness of PEBAX coating was 0.8 μm.

FIG. 23 shows the ultrafiltration performance of two nanofibrous composite membranes using the same "optimized" PVA scaffolds but with two different coatings: (a) PVA treated by the GA/PVA repeat unit ratio of 0.06 and (b) commercial hydrophilic copolymer polyether-b-polyamide (PEBAX® 1074), in separation of oil/water emulsions. The thickness of the PVA coating layer was 1.8 μm, and the thickness of PEBAX® coating was 0.8 μm.

Within the time period of the cross-flow testing, no apparent fouling was seen in either of the composite membranes. The flux rate of the nanofibrous composite membrane with the chosen PVA hydrogel coating was about 130 L/m²·h, significantly higher than that of the nanofibrous composite membrane with the PEBAX® coating (the flux rate was about 57 L/m²·h) with thinner top coating layer thickness. Both membranes exhibited a similarly high rejection ratio (>99.5%). It was noted that the flux rate of the commercial TFC membranes, consisting of porous membrane and a very thin layer of nonporous PEBAX® coating (thickness 0.2-0.5 μm), was about 50 L/m²·h in the separation of similar oil/water emulsions, and was significantly lower than the PVA electrospun scaffold/PVA hydrogel nanofibrous composite membrane.

While the above description contains many specific details of methods in accordance with this disclosure, these specific details should not be construed as limitations on the scope of the disclosure, but merely as exemplifications of preferred embodiments thereof. Those skilled in the art will envision many other possible variations that all within the scope and spirit of the disclosure.

What is claimed is:
1. An article comprising:
    a substrate comprising a nanofibrous scaffold comprising fibers having a diameter of from about 1 nm to about 20,000 nm; and
    a coating on said substrate comprising a polymer in combination with at least one nanofiller having a diameter from about 0.3 nm to about 300 nm,
    wherein the coating has a thickness of from about 1 nm to about 4000 nm.
2. The article of claim 1 wherein the polymer is a hydrophilic polymer selected from the group consisting of polysaccharides, polyalcohols, polyalkylene oxides, polyimines, polyacrylic acids, polyamides, polyamines, polyurethanes, polyureas, derivatives thereof and copolymers thereof.
3. The article of claim 1 wherein the polymer is a hydrophilic polymer selected from the group consisting of chitosan, cellulose, cellulose acetate, collagen, gelatin, polyvinyl alcohol, polyethylene oxide, polyethylene glycol, polyethylene glycol-grafted chitosan, polyethylene glycol-grafted polymethyl methacrylate, polyethylene imine, polyvinylpyrrolidone, poly(ether-co-amide) copolymers, polybenzimidazole, nylon 6, nylon 66, nylon 12, polyallylamine, derivatives thereof and copolymers thereof.
4. The article of claim 1 wherein the polymer is a hydrophobic polymer selected from the group consisting of polyolefins, polysulfones, fluoropolymers, polyesters, polycarbonates, polystyrenes, polynitriles, polyacrylates, polyacetates, derivatives thereof and copolymers thereof.
5. The article of claim 4 wherein the polymer is a hydrophobic polymer selected from the group consisting of polyethylene, polypropylene, polyethersulfone, polyvinylidene fluoride, polytetrafluoroethylene, polyethylene terephthalate, polytrimethylene terephthalate, polybutylene terephthalate, polystyrene, polyacrylonitrile, polymethyl methacrylate, polyvinyl acetate, derivatives thereof and copolymers thereof.
6. The article of claim 1 wherein the nanofiller has a length of from about 1 nm to about 500 microns.
7. The article of claim 1 wherein the nanofiller is selected from the group consisting of organic nanofillers and inorganic nanofillers.
8. The article of claim 1 wherein the nanofiller is selected from the group consisting of single-walled carbon nanotubes, multi-walled carbon nanotubes, carbon nanofibers, bucky balls, functionalized graphite nanoparticles, functionalized gold nanoparticles, functionalized cobalt nanoparticles, functionalized cadmium nanoparticles, functionalized copper nanoparticles, functionalized iron nanoparticles, functionalized lead nanoparticles, functionalized zinc nanoparticles, functionalized palladium nanoparticles, silica, polyhedral oligomeric silsesquioxanes, layered silicates, functionalized inorganic nanotubes containing metallic compounds selected from the group consisting of gold, cobalt, cadmium, copper, iron, lead, zinc and palladium, and derivatives thereof.
9. The article of claim 1 wherein the nanofiller is functionalized with a monomer or oligomer of the polymer comprising the coating.
10. The article of claim 1 wherein the nanofiller comprises carbon nanotubes selected from the group consisting of single-walled carbon nanotubes, multi-walled carbon nanotubes and carbon nanofibers having a diameter of from about

1 nm to about 100 nm, optionally functionalized with a monomer or oligomer of the polymer comprising the coating.

11. The article of claim 1, wherein the coating has a pore or channel size of from about 0.2 nm to about 30 nm.

12. The article of claim 1, wherein the nanofiller is present in the coating in an amount of from about 0.1 percent by weight to about 95 percent by weight of the coating.

13. The article of claim 1, wherein the coating comprises from about 1 to about 5 different nanofillers.

14. The article of claim 1, wherein the nanofiller is functionalized with at least one hydrophilic functional group selected from the group consisting of carboxylic acid groups, carbonyl groups, hydroxy groups, ethylene oxides, alcohols, saccharides, amine groups, DNA, and protein fragments.

15. The article of claim 1, wherein the nanofiller is functionalized with at least one hydrophobic group selected from the group consisting of linear aliphatic compounds having from about 1 to about 20 carbon atoms, and aromatic hydrocarbons.

16. The article of claim 1, wherein the substrate is a nonwoven polymer selected from the group consisting of polyolefins, polyesters, polyamides, polyurethanes, fluorinated polymers, derivatives thereof and copolymers thereof.

17. The article of claim 1 wherein the substrate is a nonwoven polymer selected from the group consisting of polyethylene, polypropylene, polyethylene terephthalate, polytrimethylene terephthalate, polybutylene terephthalate, nylon 6, nylon 66, nylon 12, derivatives thereof and copolymers thereof.

18. The article of claim 1 wherein the nanofibrous scaffold comprises a polymer selected from the group consisting of polyolefins, polysulfones, fluoropolymers, polyesters, polyamides, polycarbonates, polystyrenes, polynitriles, polyacrylates, polyacetates polyalcohols, polysaccharides, polyalkylene oxides, polyurethanes, polyureas, polyimines polyacrylic acids, polysiloxanes, poly(ester-co-glycol) copolymers, poly(ether-co-amide) copolymers, derivatives thereof and copolymers thereof.

19. The article of claim 1 wherein the nanofibrous scaffold comprises a polymer selected from the group consisting of polyethylene, polypropylene, polyethersulfone, polyvinylidene fluoride, polyethylene terephthalate, polytrimethylene terephthalate, polybutylene terephthalate, nylon 6, nylon 66, nylon 12, polystyrene, polyacrylonitrile, polymethyl methacrylate, polyvinyl acetate, polyvinyl alcohol, chitosan, cellulose, collagen, gelatin, polyethylene oxide, polyethylene glycol, polyvinyl chloride, polyethylene imine, polyvinylpyrrolidone, polydimethylsiloxane, derivatives thereof and copolymers thereof.

20. The article of claim 1 wherein the nanofibrous scaffold further comprises at least one nanofiller having a diameter from about 0.3 nm to about 300 nm.

21. The article of claim 1 wherein the nanofibrous scaffold has a thickness of from about 1 μm to about 500 μm.

22. The article of claim 1, wherein the nanofibrous scaffold possesses voids with an effective diameter of from about 2 nm to about 200 μm.

23. An article comprising a nanofibrous scaffold comprising: fibers having a diameter of from about 1 nm to about 20,000 nm; voids with an effective diameter of from about 2 nm to about 200 μm; and a thickness of from about 1 μm to about 500 μm.

24. The article of claim 23 wherein the nanofibrous scaffold comprises a polymer selected from the group consisting of polyolefins, polysulfones, fluoropolymers, polyesters, polyamides, polycarbonates, polystyrenes, polynitriles, polyacrylates, polyacetates, polyalcohols, polysaccharides, polyalkylene oxides, polyurethanes, polyureas, polyimines, polyacrylic acids, polysiloxanes, poly(ester-co-glycol) copolymers, poly(ether-co-amide) copolymers, derivatives thereof and copolymers thereof.

25. The article of claim 23 wherein the nanofibrous scaffold comprises a polymer selected from the group consisting of polyethylene, polypropylene, polyethersulfone, polyvinylidene fluoride, polyethylene terephthalate, polytrimethylene terephthalate, polybutylene terephthalate, nylon 6, nylon 66, nylon 12, polystyrene, polyacrylonitrile, polymethyl methacrylate, polyvinyl acetate, polyvinyl alcohol, chitosan, cellulose, collagen, gelatin, polyethylene oxide, polyethylene glycol, polyvinyl chloride, polyethylene imine, polyvinylpyrrolidone, polydimethylsiloxane, derivatives thereof and copolymers thereof.

26. The article of claim 23 wherein the nanofibrous scaffold comprises at least one layer prepared from at least one solution of at least one polymer utilizing a process selected from the group consisting of electro-spinning, electro-blowing, blowing-assisted electro-spinning, and solution blowing.

27. The article of claim 26 wherein the nanofibrous scaffold comprises from about 1 to about 5 layers prepared from about 1 to about 5 solutions of from about 1 to about 5 polymers.

28. The article of claim 26 wherein the polymer is in a solvent selected from the group consisting of N,N-dimethyl formamide, tetrahydrofuran, methylene chloride, dioxane, ethanol, propanol, butanol, chloroform, water, and mixtures thereof.

29. The article of claim 28 wherein the polymer is present in the solvent at an amount ranging from about 1 to about 50 percent by weight.

30. The article of claim 26 wherein the nanofibrous scaffold is electrospun using a field strength from about 0.5 to about 5 kV/cm with a solution flow rate of from about 5 to about 100 μl/min.

31. The article of claim 23, further comprising a substrate comprising a nonwoven polymer selected from the group consisting of polyolefins, polyesters, polyamides, polyurethanes, fluorinated polymers, derivatives thereof and copolymers thereof.

32. The article of claim 31 wherein the substrate comprises a polymer selected from the group consisting of polyethylene, polypropylene, polyethylene terephthalate, polytrimethylene terephthalate, polybutylene terephthalate, nylon 6, nylon 66, nylon 12, derivatives thereof and copolymers thereof.

33. The article of claim 31 further comprising an adhesive layer between the substrate and the nanofibrous scaffold.

34. The article of claim 33 wherein the adhesive layer is selected from the group consisting of chitosan, collagen, gelatin, polyvinyl alcohol, polyethylene oxide, derivatives thereof, and copolymers thereof.

35. The article of claim 23 further comprising a coating on the nanofibrous scaffold of a polymer in combination with at least one nanofiller having a diameter ranging from about 0.3 nm to about 300 nm.

36. The article of claim 23 wherein the nanofibrous scaffold further comprises at least one nanofiller having a diameter from about 0.3 nm to about 300 nm.

37. An article comprising
a substrate;
a nanofibrous scaffold comprising fibers having a diameter of from about 1 nm to about 20,000 nm applied to a surface of the substrate; and
a coating on said nanofibrous scaffold on a surface opposite a surface applied to said substrate comprising a polymer in combination with at least one functionalized nanofiller having a diameter ranging from about 1 nm to about 100 nm.

38. An article comprising an asymmetric nanofibrous scaffold layer having a bottom surface and a top surface, the fibers making up the bottom surface of the nanofibrous scaffold having a diameter from about 300 nm to about 10,000 nm, and the fibers making up the top surface of the nanofibrous scaffold having a diameter from about 10 nm to about 500 nm, wherein the diameter of the fibers making up the bottom surface of the nanofibrous scaffold is greater than the diameter of the fibers making up the top surface of the nanofibrous scaffold.

* * * * *